(12) United States Patent
Kolesnikov

(10) Patent No.: US 10,019,814 B2
(45) Date of Patent: Jul. 10, 2018

(54) METHOD, APPARATUS AND SYSTEM FOR DETERMINING A LUMA VALUE

(71) Applicant: CANON KABUSHIKI KAISHA, Tokyo (JP)

(72) Inventor: Volodymyr Kolesnikov, Dee Why (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/592,035

(22) Filed: May 10, 2017

(65) Prior Publication Data

US 2017/0330349 A1    Nov. 16, 2017

(30) Foreign Application Priority Data

May 16, 2016 (AU) ................................ 2016203181

(51) Int. Cl.
| | |
|---|---|
| *H04N 7/01* | (2006.01) |
| *G06T 7/90* | (2017.01) |
| *H04N 19/176* | (2014.01) |
| *H04N 19/186* | (2014.01) |
| *H04N 19/154* | (2014.01) |

(Continued)

(52) U.S. Cl.
CPC ............ *G06T 7/90* (2017.01); *H04N 9/77* (2013.01); *H04N 11/20* (2013.01); *H04N 19/154* (2014.11); *H04N 19/176* (2014.11); *H04N 19/186* (2014.11); *G06T 2207/10016* (2013.01); *G06T 2207/10024* (2013.01)

(58) Field of Classification Search
CPC .. H04N 19/154; H04N 19/176; H04N 19/186; H04N 9/77; H04N 11/20; G06T 7/90; G06T 2207/10016; G06T 2207/10024

USPC .......................................................... 348/453
See application file for complete search history.

(56) References Cited

U.S. PATENT DOCUMENTS

| | | | |
|---|---|---|---|
| 2004/0155980 A1* | 8/2004 | Itoh ........................ | H04N 9/646 348/450 |
| 2005/0276475 A1 | 12/2005 | Sawada | |

(Continued)

OTHER PUBLICATIONS

Jacob Strom, Jonatan Samuelsson, Martin Pettersson, Kenneth Andersson, Per Wennersten, Rickard Sjöberg, Ericsson's response to CfE for HDR and WCG, ISO/IEC JTC1/SC29/WG11, MPEG2014/m36184, Feb. 2015, Geneva, Switzerland, 11 pages.

*Primary Examiner* — Michael Lee
(74) *Attorney, Agent, or Firm* — Canon USA, Inc. I.P. Division

(57) ABSTRACT

A method of determining luma values from 4:4:4 RGB video data for encoding chroma downsampled 4:2:0 YCbCr video data into a bitstream. Initial coefficents are determined for a region of a colour space the region being one of a plurality of regions located in the colour space and each region having a plurality of associated coefficients. The determined initial coefficients are applied to an initial image to produce a test image, the test image being a chroma downsampled 4:2:0 YCbCr version of the initial image. A measure of quality is determined by comparing the initial image and the test image. The determined initial coefficients are modified to increase the determined measure of quality. Luma values are determined from 4:4:4 RGB video data for encoding chroma downsampled 4:2:0 YCbCr video data into a bitstream using the modified coefficients.

7 Claims, 16 Drawing Sheets

(51) Int. Cl.
*H04N 11/20* (2006.01)
*H04N 9/77* (2006.01)

(56) References Cited

U.S. PATENT DOCUMENTS

| | | | |
|---|---|---|---|
| 2010/0208989 A1* | 8/2010 | Narroschke | H04N 1/646 382/166 |
| 2013/0278823 A1 | 10/2013 | Kobayashi et al. | |
| 2014/0255608 A1* | 9/2014 | Eibon | C09D 133/00 427/380 |
| 2017/0188000 A1* | 6/2017 | Rosewarne | H04N 9/77 |

\* cited by examiner

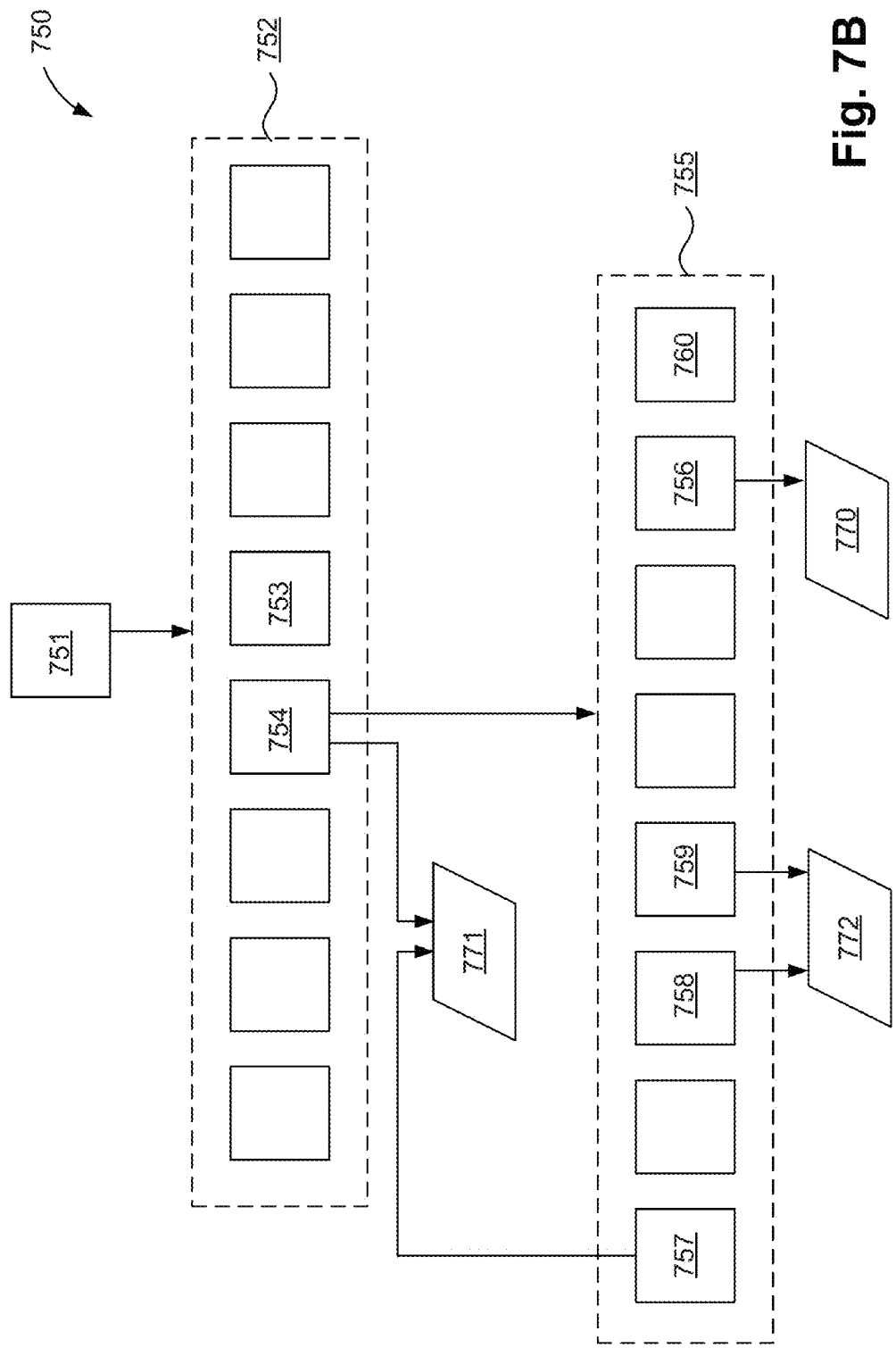

METHOD, APPARATUS AND SYSTEM FOR DETERMINING A LUMA VALUE

REFERENCE TO RELATED PATENT APPLICATION(S)

This application claims the benefit under 35 U.S.C. § 119 of the filing date of Australian Patent Application No. 2016203181, filed May 16, 2016, hereby incorporated by reference in its entirety as if fully set forth herein.

TECHNICAL FIELD

The present invention relates generally to digital video signal processing and, in particular, to a method, apparatus and system for determining a luma value from 4:4:4 RGB video data. The present invention also relates to a computer program product including a computer readable medium having recorded thereon a computer program for determining a luma value from 4:4:4 RGB video data.

BACKGROUND

Development of standards for conveying high dynamic range (HDR) and wide colour gamut (WCG) video data and development of displays capable of displaying HDR video data is underway. Standards bodies such as International Organisations for Standardisation/International Electrotechnical Commission Joint Technical Committee 1/Subcommittee 29/Working Group 11 (ISO/IEC JTC1/SC29/WG11), also known as the Moving Picture Experts Group (MPEG), the International Telecommunications Union-Radiocommunication Sector (ITU-R), the International Telecommunications Union-Telecommunication Sector (ITU-T), and the Society of Motion Picture Television Experts (SMPTE) are investigating the development of standards for representation and coding of HDR video data.

HDR video data covers a wide range of luminance intensities, far beyond that used in traditional standard dynamic range (SDR) services. For example, the Perceptual Quantizer (PQ) Electro-Optical Transfer Function (EOTF), standardised as SMPTE ST.2084, is defined to support a peak luminance of up to 10,000 candela/metre$^2$ (nits) whereas traditional television services are defined with a 100 nit peak brightness (although more modern sets increase the peak brightness beyond this). The minimum supported luminance is zero nits, but for the purposes of calculating the dynamic range the lowest non-zero luminance is used (i.e. $4*10^{-5}$ nits for PQ quantised to 10 bits). The physical intensity of a light source is measured in candela/meter$^2$ and is also referred to as 'luminance' or 'linear light'. When luminance is encoded using PQ (or other transfer function) the encoded space is referred to as luma'. Luma is intended to be more perceptually uniform (i.e. a given change in the luma value results in the same perceived change in brightness regardless of the starting point). Traditional power functions such as the 'gamma' of SDR television is somewhat perceptually uniform. Transfer functions such as PQ are designed according to models of human visual perception to be more perceptually uniform. In any case, the relationship between luma and luminance is highly non-linear.

Video data generally includes three colour components, where each frame comprises three planes of samples and each plane corresponds to one colour component. The relationship between the sampling rates of the planes is known as a 'chroma format'. When each plane is sampled at the same rate, the video data is said to be in a '4:4:4' chroma format. In the 4:4:4 chroma format, each triplet of collocated samples forms a 'pixel', having a colour and luminance resulting from the values of the triplet of collocated samples. When referring to a sample to which a gamma-correction or a transfer function was already applied, the colour component is referred to as 'chroma' and the luminance component is referred to as luma' to reflect the fact that the colour components' values are not 'true' colour and luminance. The prime symbol (') is sometimes used after the variable name to indicate a luma value (e.g. Y'). When the second and third of the three planes is sampled at half the rate horizontally and vertically compared to the first plane, the video data is said to be in a '4:2:0' chroma format. As the use of the 4:2:0 results in fewer samples being processed compared to 4:4:4, the result is lower complexity in the video codec. Then, each pixel has one luma sample and groups of four pixels share a pair of chroma samples. Moreover, in such a case, typically the 'YCbCr' colour space is used, with the luma (Y) channel stored in the first plane, where the sampling rate is highest and the chroma channels (Cb and Cr) stored in the second and third planes respectively, where the lower sampling rate for chroma information results in lower data rate with little impact subjectively for viewers of the decoded video data.

When displaying the video data, a conversion back to 4:4:4 is required to map the video data onto modern display technology, such as an LCD panel. As such, a pair of chroma samples (i.e Cb and Cr samples) is combined with four luma (Y) samples. Any residual luminance information present in the Cb and Cr samples is known to interfere with the luminance information present in each Y sample, resulting in shifts in the 4:4:4 output from the 4:2:0 to 4:4:4 conversion process. In earlier 'standard dynamic range' (SDR) systems using a transfer function that is a power function for encoding of luma and chroma samples (i.e. a 'gamma function') the nonlinearity of the transfer function was less than is the case for Perceptual Quantizer (PQ) Electro-Optical Transfer Function (EOTF).

SUMMARY

It is an object of the present invention to substantially overcome, or at least ameliorate, one or more disadvantages of existing arrangements.

According to one aspect of the present disclosure, there is provided a method of determining luma values from 4:4:4 RGB video data for encoding chroma downsampled 4:2:0 YCbCr video data into a bitstream, the method comprising:

determining initial coefficents for a region of a colour space the region being one of a plurality of regions located in the colour space and each region having a plurality of associated coefficients;

applying the determined initial coefficients to an initial image to produce a test image, the test image being a chroma downsampled 4:2:0 YCbCr version of the initial image;

determining a measure of quality by comparing the initial image and the test image;

modifying the determined initial coefficients to increase the determined measure of quality; and determining luma values from 4:4:4 RGB video data for encoding chroma downsampled 4:2:0 YCbCr video data into a bitstream using the modified coefficients.

According to another aspect of the present disclosure, there is provided a system for determining luma values from 4:4:4 RGB video data for encoding chroma downsampled 4:2:0 YCbCr video data into a bitstream, the system comprising:

a memory for storing data and a computer program;

a processor coupled to the processor for executing said computer program, said computer program comprising instructions for:

determining initial coefficents for a region of a colour space the region being one of a plurality of regions located in the colour space and each region having a plurality of associated coefficients applying the determined initial coefficients to an initial image to produce a test image, the test image being a chroma downsampled 4:2:0 YCbCr version of the initial image;

determining a measure of quality by comparing the initial image and the test image;

modifying the determined initial coefficients to increase the determined measure of quality; and determining luma values from 4:4:4 RGB video data for encoding chroma downsampled 4:2:0 YCbCr video data into a bitstream using the modified coefficients.

According to still another aspect of the present disclosure, there is provided an apparatus for determining luma values from 4:4:4 RGB video data for encoding chroma downsampled 4:2:0 YCbCr video data into a bitstream, the appraratus comprising:

means for determining initial coefficents for a region of a colour space the region being one of a plurality of regions located in the colour space and each region having a plurality of associated coefficients means for applying the determined initial coefficients to an initial image to produce a test image, the test image being a chroma downsampled 4:2:0 YCbCr version of the initial image;

means for determining a measure of quality by comparing the initial image and the test image;

means for modifying the determined initial coefficients to increase the determined measure of quality; and means for determining luma values from 4:4:4 RGB video data for encoding chroma downsampled 4:2:0 YCbCr video data into a bitstream using the modified coefficients.

According to still another aspect of the present disclosure, there is provided a computer readable medium having a computer program stored thereon for determining luma values from 4:4:4 RGB video data for encoding chroma downsampled 4:2:0 YCbCr video data into a bitstream, the program comprising:

code for determining initial coefficents for a region of a colour space the region being one of a plurality of regions located in the colour space and each region having a plurality of associated coefficients code for applying the determined initial coefficients to an initial image to produce a test image, the test image being a chroma downsampled 4:2:0 YCbCr version of the initial image;

code for determining a measure of quality by comparing the initial image and the test image;

code for modifying the determined initial coefficients to increase the determined measure of quality; and code for determining luma values from 4:4:4 RGB video data for encoding chroma downsampled 4:2:0 YCbCr video data into a bitstream using the modified coefficients.

Other aspects are also disclosed.

BRIEF DESCRIPTION OF THE DRAWINGS

At least one embodiment of the present invention will now be described with reference to the following drawings and appendices, in which:

FIG. 7B is an example of the 'octant hierarchy' structure;

DETAILED DESCRIPTION INCLUDING BEST MODE

Figure 1:
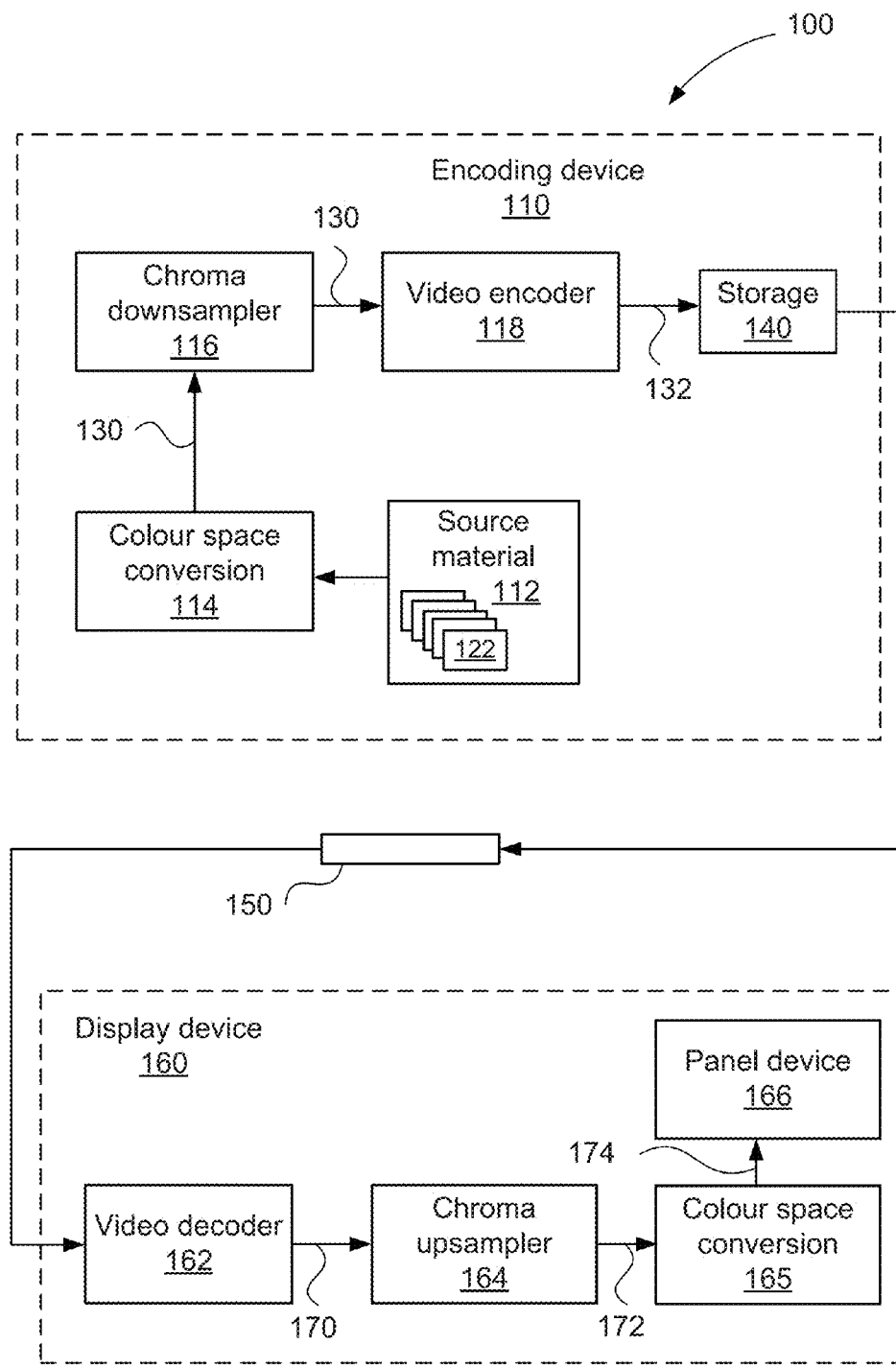
FIG. 1 is a schematic block diagram showing a video capture and reproduction system that includes a video encoder and a video decoder.

Where reference is made in any one or more of the accompanying drawings to steps and/or features, which have the same reference numerals, those steps and/or features have for the purposes of this description the same function(s) or operation(s), unless the contrary intention appears.

As discussed above, although the possibility of brightness and colour distortion resulting from chroma upconversion is present in SDR systems, the less nonlinear transfer function reduces the extent of such artefacts compared to the case where the Perceptual Quantizer (PQ) Electro-Optical Transfer Function (EOTF) is used. Methods to alleviate such artefacts operate at the 'pixel rate' of the video processing system, and as such, relatively low complexity or at least, fixed complexity methods are required. In modern video processing systems, the pixel rate is very high (e.g. 4K at 60 frames per second) where $3840 \times 2160 \times 60 = 498 \times 10^6$ pixels per second need to be processed. As such, for real time processing, a need exists for implementations that are feasible for hardware implementation.

FIG. 1 is a schematic block diagram showing functional modules of a video encoding and decoding system 100. The system 100 includes an encoding device 110, such as a digital video camera, a display device 160, and a communication channel 150 interconnecting the two. Generally, the encoding device 110 operates at a separate location (and time) to the display device 160. As such, the system 100 generally includes separate devices operating at different times and locations. Additional instances of the display device 160 (also considered part of the video encoding and decoding system 100) are considered to be present for each recipient of the encoded video data, e.g. customers of a video streaming service or viewers of a free to air broadcast service.

The encoding device 110 encodes source material 112. The source material 112 may be obtained from a complementary metal oxide semiconductor (CMOS) imaging sensor of a video camera with a capability to receive a wider range of luminance levels than traditional SDR imaging sensors. Additionally, the source material 112 may also be obtained using other technologies, such as charged coupled device (CCD) technology, or generated from computer graphics software, or some combination of these sources. Also, the source material 112 may simply represent previously captured and stored video data.

The source material 112 includes a sequence of frames 122. Collectively, the frames 122 form uncompressed video data 130. In the context of preparing video bitstreams for distribution, the source material 112 is generally present in the 4:4:4 chroma format and requires downconversion to the 4:2:0 chroma format prior to encoding. For example, if the source material 112 is obtained from an imaging sensor, a 'debayering' process is applied that results in 4:4:4 video data. Moreover, the video data is sampled in RGB. The video data 130 includes codewords for the frames 122, such that three planes of codewords are present for each frame. The source material 112 is generally sampled as tri-stimulus values in the RGB domain, representing linear light levels. Conversion of linear light RGB to a more perceptually uniform space is achieved by the application of a non-linear transfer function and results in an R'G'B' representation comprising R'G'B' values. The transfer function may be an opto-electrical transfer function (OETF), in which case the R'G'B' values represent physical light levels of the original scene. In arrangements where the transfer function is an opto-electrical transfer function (OETF), the video processing system 100 may be termed a 'scene-referred' system. Alternatively, the transfer function may be the inverse of an electro-optical transfer function (EOTF), in which case the R'G'B' values represent physical light levels to be displayed. In arrangements where the transfer function is the inverse of an electro-optical transfer function (EOTF), the video processing system 100 may be termed a 'display-referred' system.

As seen in FIG. 1, a colour space conversion module 114 is used to convert the R'G'B' representation to a colour space that somewhat decorrelates the luma from each of R', G' and B', such as Y'CbCr. The colour space conversion module 114 applies a matrix transform and is thus a linear operation. Application of the colour space conversion on R'G'B' (i.e. luma), rather than RGB (i.e. luminance), results in some distortions due to the non-linear nature of the applicable transfer function, but is an accepted practice in SDR television and video systems known as 'non-constant luminance' (NCL). In the context of HDR, in particular when using a transfer function such as PQ, the distortions are more significant, and thus processing is performed to compensate for the distortions. The Y'CbCr representation is then quantised to a specified bit depth, resulting in discrete 'codewords'. Codewords in the Y' channel encode, approximately, the luminance levels present in the source material 112 according to the transfer function as luma values represented using a particular bit depth. As the luminance information is not fully decorrelated from the Cb and Cr channels, some luminance magnitude is still present in the Cb and Cr channels. One method of visualising the luminance magnitude still present in the Cb and Cr channels is that in the YCbCr, the range of valid codewords for Cb and Cr is dependent on the magnitude of Y'. As Y' approaches zero, the range of Cb and Cr reduces. As such, the afforded colour fidelity is reduced at low luminances. The same phenomenon is observed as Y increases to the maximum supported value. The source material 112, expressed as RGB values, has three distinct components, whose weighted sum forms the luminance. Then, each display primary of the display device 160 (i.e. R, G and B) are necessarily less bright than when all display primaries of the display device 160 are producing maximum allowed output. The range of distinct codewords is implied by the bit depth in use (and thus, implicitly, the quantisation of the codewords is dependent on the bit depth in use). Generally, the video processing system 100 operates at a particular bit depth, such as ten (10) bits. Operation at this particular bit depth implies the availability of 1024 discrete codewords. Further restriction upon the range of available samples may also be present. For example, if the uncompressed video data 130 is to be transported within the encoding device 110 using the 'serial digital interface' (SDI) protocol, the codeword range is restricted to 4-1019 inclusive, giving 1016 discrete codeword values. Alternatively, TV broadcast systems may limit the codeword range to 64-940 for 10-bit video data.

As also seen in FIG. 1, a chroma downsampler 116 converts the source material 112 from the 4:4:4 chroma format to produce uncompressed video data 130 in the 4:2:0 chroma format. The chroma downsampler 116 operates in real-time, performing a function referred to as luma sample adjustment', described further below with reference to FIGS. 7A-12B.

The video encoder 118 encodes each frame as a sequence of square regions, known as 'coding tree units', producing an encoded bitstream 132. The video encoder 118 conforms to a video coding standard such as high efficiency video coding (HEVC), although other standards such as H.264/AVC, VC-1 or MPEG-2 may also be used. The encoded bitstream 132 can be stored, e.g. in a non-transitory storage device or similar arrangement 140, prior to transmission over communication channel 150.

The encoded bitstream 132 is conveyed (e.g. transmitted or passed) to the display device 160. Examples of the display device 160 include an LCD television, a monitor or a projector. The display device 160 includes a video decoder 162 that decodes the encoded bitstream 132 to produce decoded codewords 170. The decoded codewords 170 correspond approximately to the codewords of the uncompressed video data 130. The decoded codewords 170 may not be exactly equal to the codewords of the uncompressed video data 130 due to lossy compression techniques applied in the video encoder 118. The decoded codewords 170 are passed to a chroma upsampler module 164 to produce decoded 4:4:4 video data 172. The chroma upsampler module 164 applies a particular set of filters to perform the upsampling from 4:2:0 to 4:4:4, as described further with reference to FIGS. 3A and 3B. The decoded 4:4:4 video data 172 is then converted from YCbCr to RGB in a colour space conversion module 165, to produce RGB video data 174. The RGB video data 174 is passed as input to the panel display 166 for visual reproduction of the video data. For example, the reproduction may modulate the amount of backlight illumination passing through an LCD panel. The panel device 166 is generally an LCD panel with an LED backlight. The LED backlight may include an array of LEDs to enable a degree of spatially localised control of the maximum achievable luminance. The panel device 166 may alternatively use 'organic LEDs' (OLEDs).

The relationship between a given codeword of the decoded codewords 170 and the corresponding light output emitted from the corresponding pixel in the panel device 166 is nominally the inverse of the transfer function. For a display-referred system, the inverse of the transfer function is the EOTF. For a scene-referred system, the inverse of the transfer function is the inverse OETF. For systems using 'relative luminance', the light output is not controlled only by the codeword and the inverse of the transfer function. The light output may be further modified by user control of the display's contrast or brightness settings.

In one arrangement of the video processing system 100, the EOTF in use is the PQ-EOTF (i.e., SMPTE ST.2084) as will be described further below with reference to FIG. 4. Another example of a transfer function configured for carrying HDR video data is the Hybrid Log Gamma (HLG) Opto-Electrical Transfer Function (OETF), standardised as ARIB STD B-67. The HLG-OETF is nominally defined to support a peak luminance of 1,200 nits. However, as the HLG-OETF is a relative luminance transfer function, a viewer may adjust the contrast and brightness settings of a display to display brighter luminances than the nominal peak luminance.

Figure 2A:
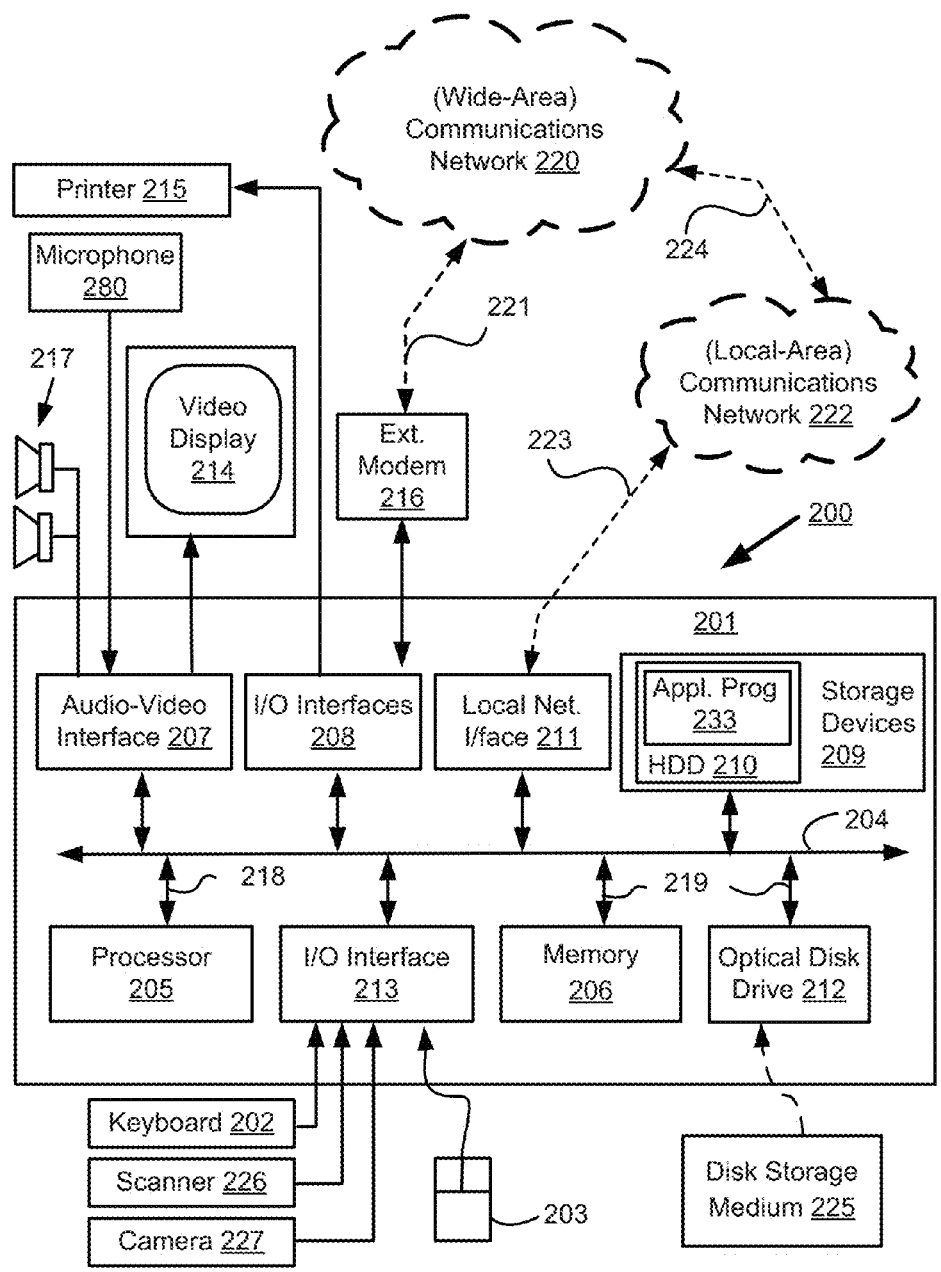
FIGS. 2A and 2B form a schematic block diagram of a general purpose computer system upon which one or both of the video encoding and decoding system of FIG. 1 may be practiced.

Notwithstanding the example devices mentioned above, each of the source device 110 and display device 160 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a digital video camera 227, which may be configured as the HDR imaging sensor 112, and a microphone 280, which may be integrated with the camera; and output devices including a printer 215, a display device 214, which may be configured as the display device 160, and loudspeakers 217. An external Modulator-Demodulator (Modem) transceiver device 216 may be used by the computer module 201 for communicating to and from a communications network 220 via a connection 221. The communications network 220, which may represent the communication channel 150, may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220. The transceiver device 216 may additionally be provided in the capture device 110 and the display device 160 and the communication channel 150 may be embodied in the connection 221.

Further, whilst the communication channel 150 of FIG. 1 may typically be implemented by a wired or wireless communications network, the bitstream 132 may alternatively be conveyed between the encoding device 110 and the display device 160 by way of being recorded to a non-transitory memory storage medium, such as a CD or DVD. In this fashion, the network 150 is merely representative of one path via which the bitstream 132 is conveyed between the encoding device 110 and the display device 160, with the storage media being another such path.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. The signal from the audio-video interface 207 to the computer monitor 214 is generally the output of a computer graphics card. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the communication channel 120 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu-ray Disc™) USB-RAM, portable, external hard drives, and floppy disks, for example, may be used as appropriate sources of data to the computer system 200. Typically, any of the HDD 210, optical drive 212, networks 220 and 222 may also be configured to operate as the HDR imaging sensor 112, or as a destination for decoded video data to be stored for reproduction via the display 214. The capture device 110 and the display device 160 of the system 100 may be embodied in the computer system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the video encoder 118 and the video decoder 162, as well as methods described below, may be implemented using the computer system 200 wherein the video encoder 118, the video decoder 162 and methods to be described, may be implemented as one or more software application programs 233 executable within the computer system 200. In particular, the video encoder 118, the video decoder 162 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the video encoder 118, the video decoder 162 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
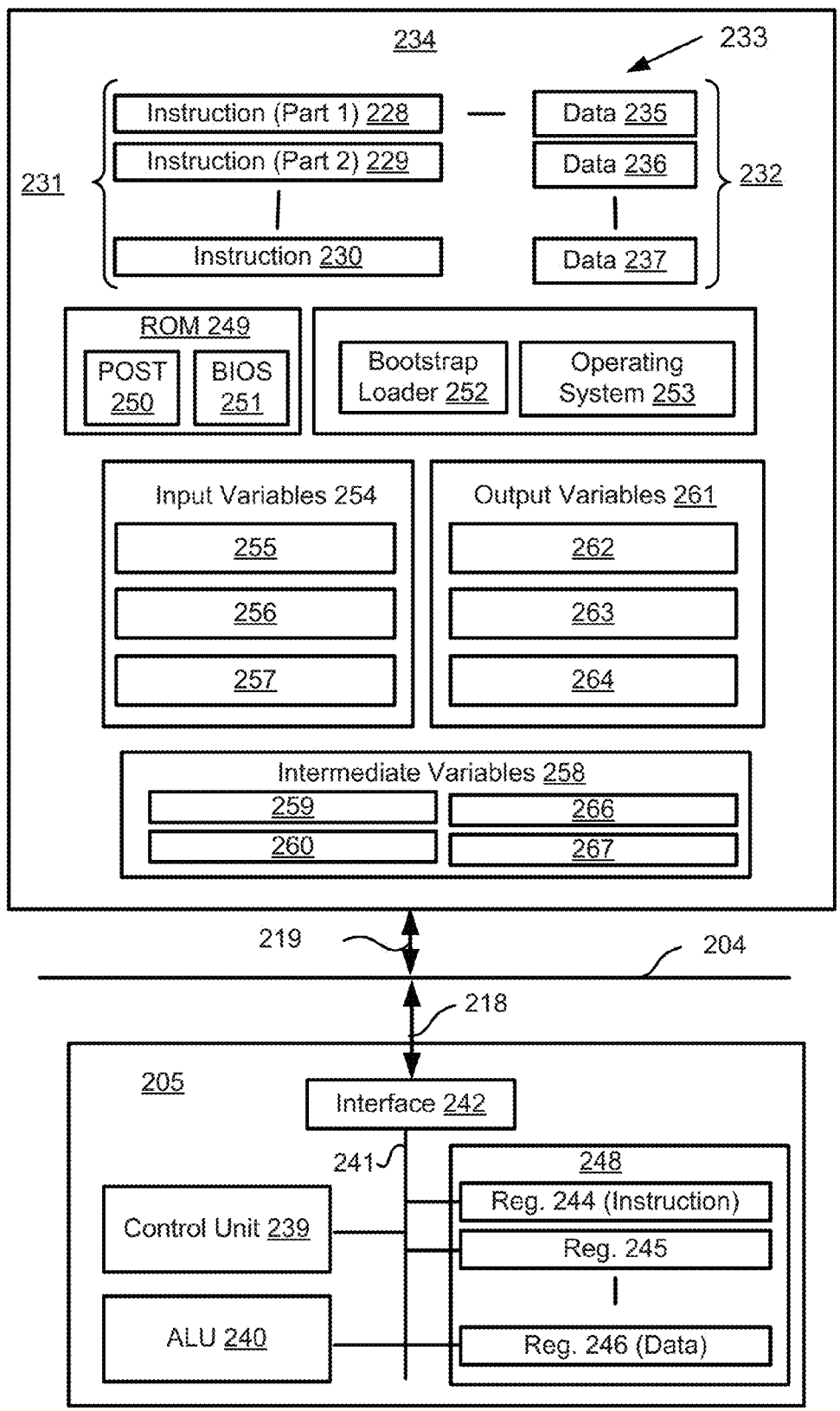

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 118, the video decoder 162 and the described methods may use input variables 254, which are stored in the memory 234 in corresponding memory locations 255, 256, 257. The video encoder 118, the video decoder 142 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

(a) a fetch operation, which fetches or reads an instruction 231 from a memory location 228, 229, 230;

(b) a decode operation in which the control unit 239 determines which instruction has been fetched; and (c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Figure 3A:
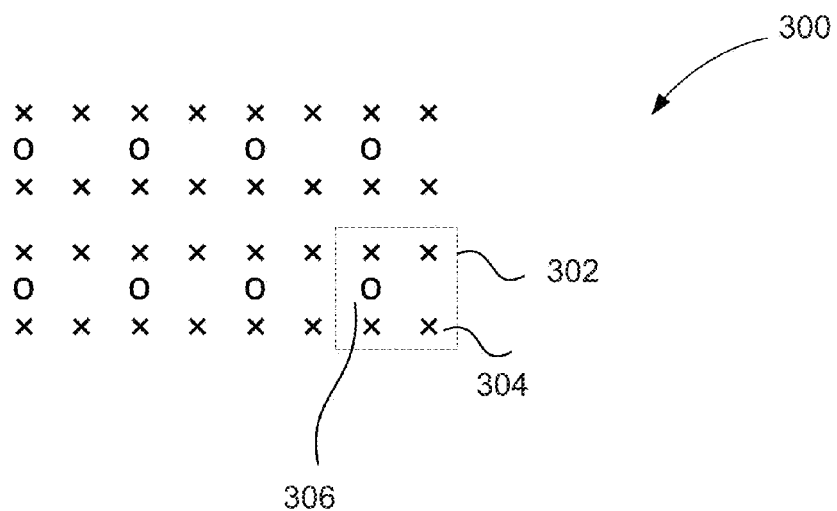
FIG. 3A shows an example sampling approach for video data using the 4:2:0 chroma format using non-co-sited chroma samples.

FIG. 3A shows an example sampling approach for video data using the 4:2:0 chroma format with non-co-sited chroma samples. FIG. 3A shows a frame 300 of uncompressed video data 130 which includes three colour planes. The first colour plane has luma samples, such as a luma sample 304, which are shown each with 'X' in FIG. 3A. Each 'X' corresponds to one luma sample. Note that the frame 300 generally encodes video data in the YCbCr colour space and, as such, the Y, Cb and Cr values are not actually the result of a sampling process. Instead, the Y, Cb and Cr values can also be referred to as 'codewords' and the Y, Cb and Cr values are the result of applying a colour transform, such as described with reference to FIG. 5. Then, chroma sample pair 306 includes two chroma samples, a Cb and a Cr sample. The Cb and Cr samples are only present at half the frequency horizontally and vertically compared to the luma samples. Moreover, in the example of FIG. 3A, the chroma samples are not collocated with particular luma samples. Other configurations of the 4:2:0 chroma format are also possible where the chroma samples are located differently, relative to the luma samples. Configurations where the chroma samples overlap with luma samples (i.e. every second luma sample horizontally and vertically) are referred to as 'co-sited' sampling.

As seen in FIG. 3A, luma samples 302 (contained in the illustrated box) are the four luma samples associated with the chroma samples 306. Such a pattern repeats throughout the frame 300. The chroma samples 306 are 'shared' in the sense that when upconverting to the 4:4:4 chroma format, the same chroma samples are used with each of the four luma samples (e.g. when using nearest-neighbour interpolation to produce 4:4:4 chroma samples). Different upsampling filters are also possible, resulting in a different relationship between the 4:2:0 chroma samples and the 4:4:4 chroma samples. One example is bilinear filtering, in which case additional chroma samples are synthesised from the 4:2:0 chroma samples to produce chroma samples present at the same sampling rate as the luma samples. The interpretation of the magnitudes of a given pair of chroma samples is dependent upon the magnitude of the associated luma sample. Then, it can be seen that having multiple luma samples associated with a pair of chroma samples presents problems for reconstruction 4:4:4 video data at the decoder that corresponds to the 4:4:4 video data prior to the chroma downsampling present in the encoding device 110.

Figure 3B:
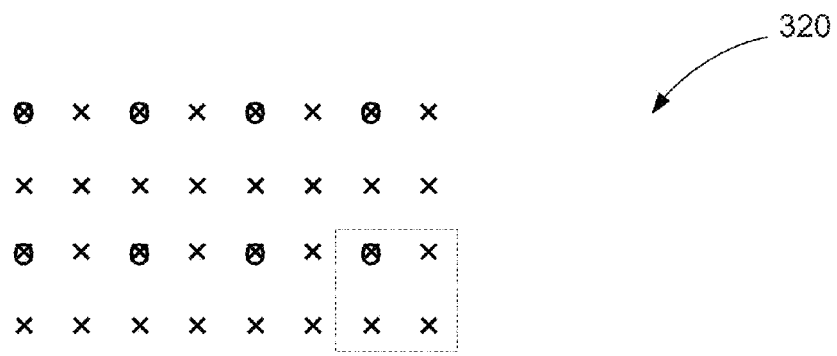
FIG. 3B shows an example sampling approach for video data using the 4:2:0 chroma format using co-sited chroma samples.

FIG. 3B shows an example sampling approach for video data using the 4:2:0 chroma format with co-sited chroma samples. In FIG. 3B, a frame 320 includes luma samples ('X') and pairs of chroma samples ('O') using the 4:2:0 chroma format. In contrast to the frame 300, the chroma samples of FIG. 3B are 'co-sited', meaning that each chroma value is sampled at a location that is collocated with a luma sample (every second luma sample horizontally and vertically). In FIG. 3A, the chroma samples were not co-sited, and do not overlap any luma samples. The distinction between co-sited and non-co-sited chroma samples can be understood by visualising the underlying video as a continuous function of luminance and chrominance, with a sampling process applied to produce the discrete samples of video data. Then, the sampling process requires consideration of the location of each sample present in each colour component. In general, an encoding device (e.g., 110) using an imaging sensor receives data already sampled by the imaging sensor according to the physical configuration of cells in the imaging sensor. Then, a 'debayering' process converts samples from this format generally into the 4:4:4 chroma format, so that the samples of 4:4:4 video data are effectively synthesised out of the samples from the imaging sensor.

Other locations for the chroma sample are also possible. The encoded bitstream 132 includes a packet known as the 'video usability information' (VUI). The VUI includes information instructing the display device 160 how to interpret the decoded samples from the video decoder 162. The VUI may include a syntax element 'chroma_sample_loc_type_top_field' that indicates the chroma sampling location. Although generally used when the video data is in 'interlaced' format, the above syntax element may also be used when the video data is in progressive format. When chroma_sample_loc_type_top_field is not present, the chroma samples are assumed to be non-co-sited (as shown in FIG. 3A). If the video data is in interlaced format, then the chroma sample location for alternate 'bottom' fields is specified by the chroma_sample_loc_type_top_field syntax element.

The encoded bitstream 132 may also contain a packet known as a Chroma resampling filter hint Supplementary Enhancement Information (SEI) message. The Chroma resampling filter hint SEI message enables signalling of the chroma filters to resample video data from one chroma format to another chroma format. Predefined filters can also be signalled, such as those defined in Rec. ITU-T T.800| ISO/IEC 15444-1.

Figure 4:
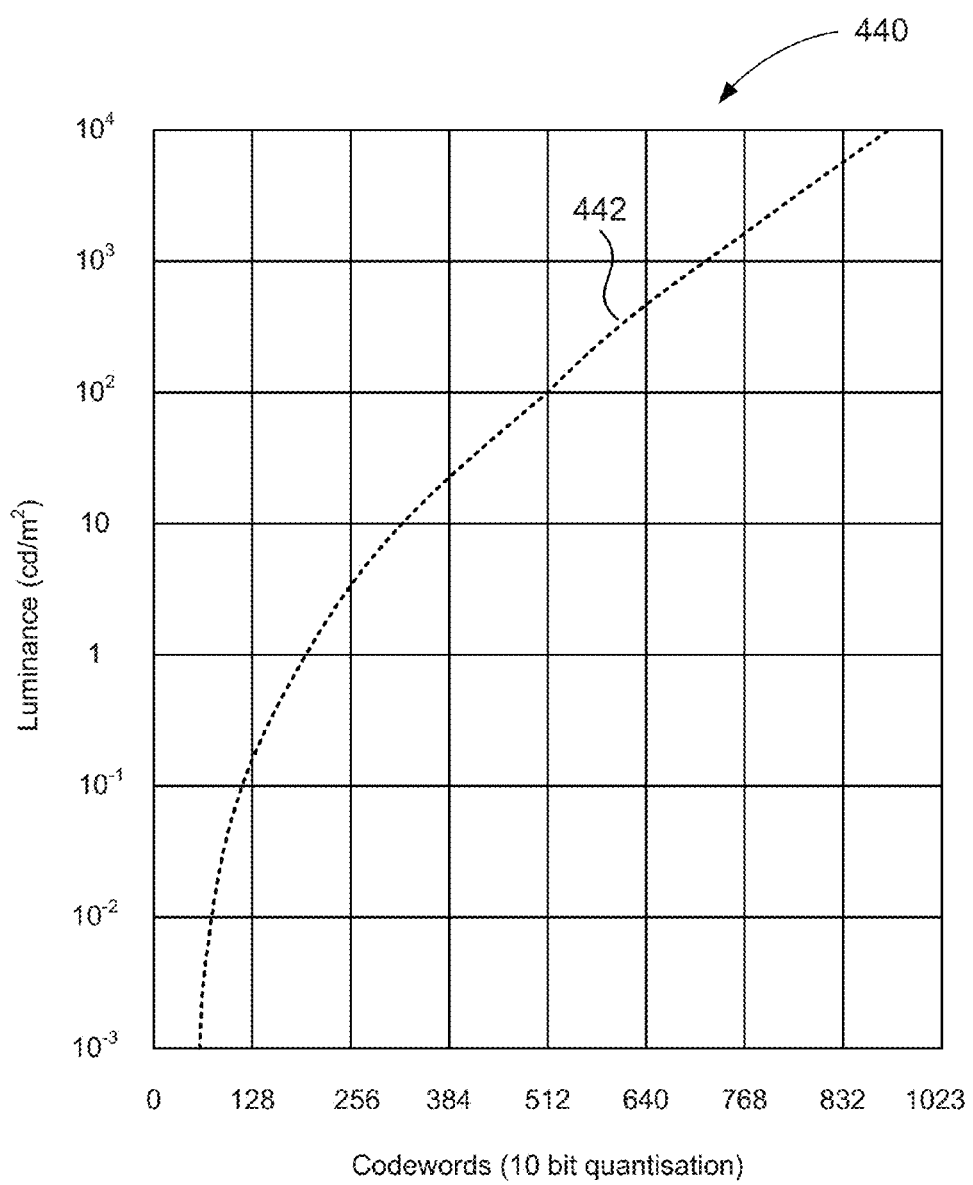
FIG. 4 shows is a graph showing the perceptual-quantiser (PQ) electro-optical transfer function (EOTF)

FIG. 4 is a graph 440 showing the perceptual-quantiser (PQ) electro-optical transfer function 442 (EOTF), with 10-bit quantisation. The PQ-EOTF 442 is configured to closely fit a curve resulting from iterative addition of multiples of just noticeable differences (f*JND) derived from a model of human visual perception known as the "Barten model". The PQ-EOTF 442 differs from the Barten model in that the lowest codeword corresponds to a luminance of 0 nits, asymptotically not depicted in FIG. 4. The graph 400 shows the codeword values along the X axis, with quantisation to ten (10) bits, and absolute luminance on the Y axis over the range supported by the PQ-EOTF 442. The range of available codewords intended for use is restricted to sixty-four (64) to nine hundred and forty (940), known as 'video range'. Such a range of available codewords accords with common practice for video systems operating at a bit depth of ten (10) bits. However, other transfer functions may permit excursions outside the sixty-four (64) to nine hundred and forty (940) range in some cases). The codeword range from sixty-four (64) to nine hundred and forty (940) corresponds to luminances from zero (0) nits (not shown on the graph of FIG. 4) to $10^4$ nits. Adjacent codewords correspond to steps above the JND threshold for a fully-adapted human eye.

Figure 5:
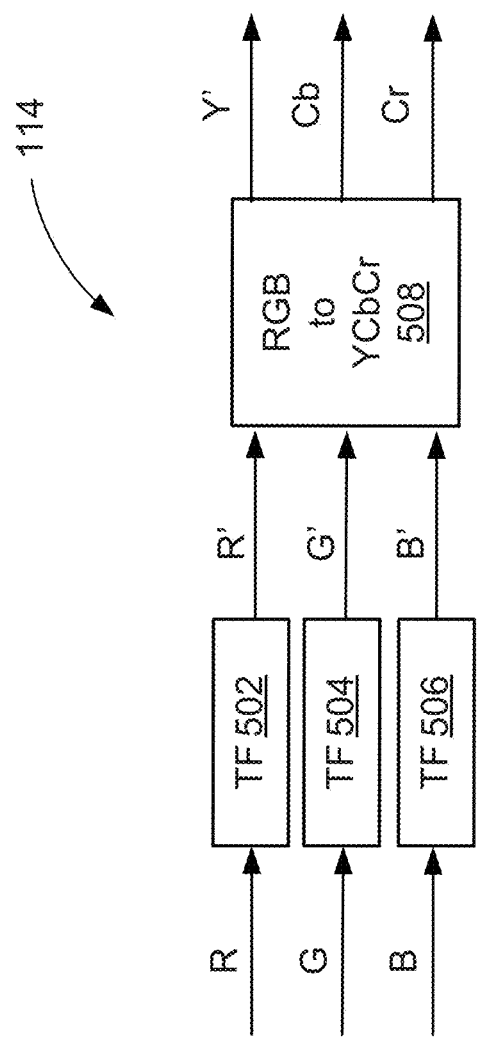
FIG. 5 is a schematic block diagram showing conversion of video data from a linear light RGB representation to a PQ-encoded YCbCr representation using 'non-constant luminance'.

FIG. 5 is a schematic block diagram showing conversion of video data from a linear light RGB representation to a PQ-EOTF encoded YCbCr representation using 'non-constant luminance'. In the example of FIG. 5, the colour space conversion module 114 accepts RGB linear light input, e.g. the source material 112. Each component is mapped using transfer function modules 502, 504 and 506 to R', G' and B'. The transfer function modules 502, 505 and 506 may implement an OETF such as ITU-R BT.709 or an inverse EOTF such as an inverse PQ-EOTF. Then, an RGB to YCbCr module 508 converts R'G'B' to Y'CbCr by performing the following Equation (1):

$$Y' = 0.2627*R' + 0.6780*G' + 0.0593*B'$$

$$Cb = (B' - Y')/1.8814$$

$$Cr = (R' - Y')/1.4746 \quad (1)$$

Considering normalised input, each of R', G' and B' lie within the interval [0, 1]. This results in a cubic volume in the R'G'B' space that contains the video data. One aspect of the chroma subsampling issue is that by performing the filtering in the perceptual domain (i.e. R'G'B') rather than the linear domain (i.e. RGB), the highly non-linear nature of the transfer function results in shifts in intensity from the filtering operation. In the case of R'G'B' being subsampled (e.g. G' is assigned to the primary colour component and R' and B' are subsampled) then multiple samples in B' and R', at the higher sampling rate of the 4:4:4 chroma format, are filtered to produce samples at the lower sampling rate of the 4:2:0 chroma format. Then, interference occurs between neighbouring pixels due to brightness information present in the B' and R' samples at the higher sampling rate being combined into B' and R' samples at the lower sampling rate. From Equation (1), the severity of the interference can be seen from the relative contribution of R' and B' to Y'.

Even though Y'CbCr is considered to 'decorrelate' luma (Y') from chroma (Cb and Cr), the decorrelation is not complete and some luminance information is still present in the Cb and Cr values. For example, when applying equation (1) to produce Y'CbCr values, the volume of valid R'G'B' values results in a different volume of valid Y'CbCr values, such that the range of valid Cb and Cr values converges at the minimum and maximum valid Y' values. At the middle Y' value, the range of permissible Cb and Cr values reaches a maximum. Thus, it can be seen that Y'CbCr has not fully decorrelated colour information from the luminance information. Then, when chroma subsampling is applied independently to the Cb and Cr samples, interference between neighbouring pixels in terms of luminance occurs. across samples, which may have quite different brightness. This interference can even result in 'out of gamut' colours, i.e. in 4:2:0 Y'CbCr values that, when converted back to 4:4:4 and then to R'G'B, have values outside the interval of [0, 1].

The RGB to YCbCr conversion may be performed with linear light RGB as input rather than R'G'B' as input. However, in many systems it is impractical to do so, as either the linear light data is not available, or the complexity of dealing with linear light data, which requires a floating point representation, is not feasible for considerations of complexity and/or real time operation. The application of the RGB to YCbCr colour conversion using R'G'B' instead of RGB video data is known as a 'non-constant luminance' approach. Also, the colour space conversion module 114 operates in the 4:4:4 chroma format, with downconversion to 4:2:0 as a subsequent step (prior to encoding).

Figure 6:
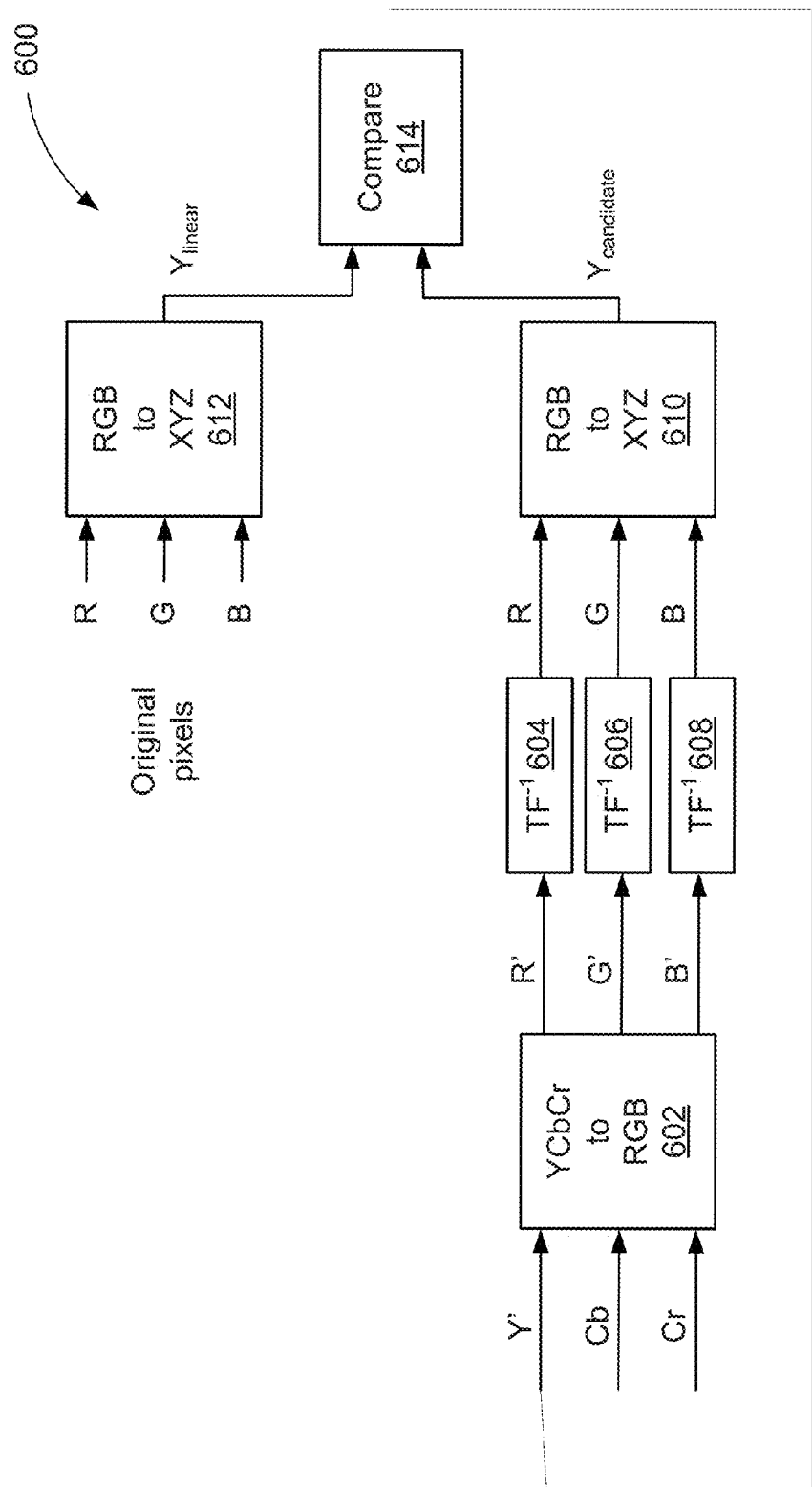
FIG. 6 shows an iterative approach for adjusting luma samples to reduce subsampling artefacts.

FIG. 6 shows an iterative approach for adjusting luma samples to reduce subsampling artefacts. In the example of FIG. 6, a luma sample adjuster 600 performs an iterative method to produce each Y sample of the frame 300. RGB samples of the source material 112 are provided to an RGB to XYZ colour transform module 612 in linear light format. The colour space 'XYZ' refers to the CIE1931 XYZ colour space. If R'G'B' are available only, the transfer function is 'undone' to restore linear light values. In the XYZ domain, only the linear luminance $Y_{linear}$ is used. The value $Y_{linear}$ corresponds to the 'true' luminance of the source material 112 and is the luminance that the display device 160 will desirably output for the considered pixel. Then, an initial Y value and a Cb and Cr values are calculated from the RGB of the source material and the Cb and Cr values are provided to a YCbCr to RGB conversion module 602. Initially, an estimate Y value is also provided to the YCbCr to RGB conversion module 602. The estimate Y may be the initial Y value. The YCbCr conversion module 602 converts the Y value and the Cb and Cr values back to R'G'B', with the resulting R'G'B' values then converted to linear light R, G, B using inverse transfer function modules 604, 606 and 608. An RGB to XYZ conversion module 610 then converts the linear light RGB values to linear light XYZ values, of which only the value $Y_{candidate}$ is further considered. The modules 602-610 have determined an actual luminance in linear light that would be emitted from the display device 160 if the estimate Y value is used. The determined actual luminance is expected to differ from the intended light level $Y_{linear}$ due to the Cb and Cr samples being associated with multiple Y samples (e.g. shared between sets of four Y samples when a 'nearest neighbour' approach is used). As seen in FIG. 6, a compare module 614 compares $Y_{linear}$ with $Y_{candidate}$ and calculates a new estimate Y value, e.g. using a bijective search. The new estimate Y value is processed again by the modules 602-610 to produce a new $Y_{candidate}$.

The steps described above with reference to FIG. 6, are applied iteratively until the value $Y_{candidate}$ is sufficiently close to $Y_{linear}$ that no further iterations are deemed necessary. At this point, the value $Y_{candidate}$ can be converted to Y' by application of the transfer function (e.g. PQ or BT.709). The resulting value Y' can then be passed to a video encoder, along with the associated samples Cb and Cr. The steps described with reference to FIG. 6 operate iteratively for each luma sample in the frame 300, making use of extensive colour space conversions, transfer function applications, and operable upon linear (i.e. floating point) data. As such, although practical for non-realtime systems (e.g. offline simulations), the approach, as defined for FIG. 6, is overly complex for a real time implementation. Real time operation implies operating at the pixel rate of a video processing system. The presence of an iterative step also presents implementation difficulties, as pixel-rate operations are generally performed in hardware and iterative methods are excessively costly to implement as the worst case must be provisioned for (i.e. maximum number of iterations happening for each pixel).

Although the luma sample adjuster 600 is shown operating on linear light RGB input, the luma sample adjuster 600 may also operate on Y'CbCr, e.g. resulting from the colour space conversion module 114. In such a case, the non-constant luminance representation of Y'CbCr has introduced some distortions that cannot be undone, hence deriving a $Y_{linear}$ that exactly matches the $Y_{linear}$ from application of the RGB to XYZ colour space transform on the source material 122 is not possible. However, a close match is still achieved. Then, a modified luma sample adjuster is possible that operates as a function of three inputs (Y, Cb and Cr) and produces a revised Y value, $Y_{final}$.

Although the result of the luma sample adjuster 600 could be encapsulated into a look-up table for all possible input values, the size of such a look-up table would be prohibitive for real-time implementation.

Figure 7A:
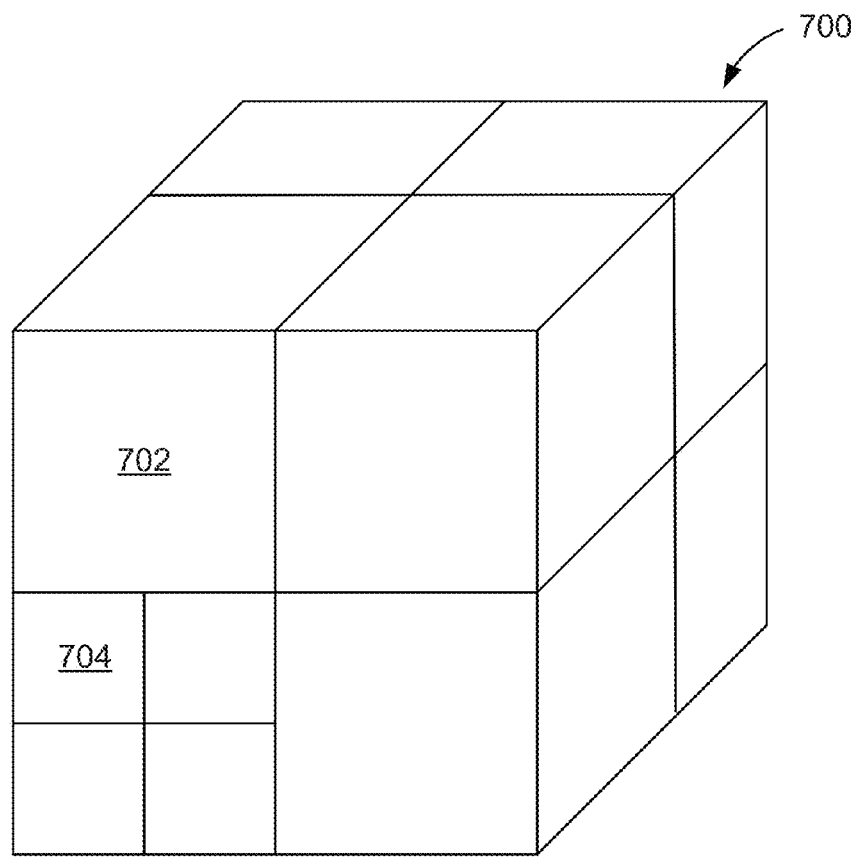
FIG. 7A shows a three-dimensional colour space subdivided into regions using an 'octant hierarchy'.

FIG. 7A shows a three-dimensional colour space 700 subdivided into regions using an 'octant hierarchy'. The colour space 700 is formed by the $Y_{linear}$, Cb and Cr components, with axes as shown in FIG. 7A. Then, the three-dimensional space 700 is subdivided into a hierarchy of regions, known as an 'octant hierarchy'. Each subdivision splits one larger region into eight smaller regions. The region shape shown is cubic, although offsets may be provided that allow for specification of non-uniform divisions (e.g. the boundaries may be controlled). The axes of FIG. 7A correspond to the codeword space for each of $Y_{linear}$, Cb and Cr. The octant hierarchy is generally limited to restrict the depth of the hierarchy and thus the smallest region (i.e., assuming boundaries are always in the middle of the parent region in each dimension) is limited to a particular size.

In FIG. 7A, an example region 702 has a size of a half of the total length of each of the dimensions. As seen in FIG. 7A, another example region 704 has a size of a half of the total length of each of the dimensions of the parent region of region 704.

FIG. 7B is an example of a structure 750 corresponding to the 'octant hierarchy' of the colour space 700. A block 751, also known as the 'root' block, structurally corresponds to the entire $Y_{linear}$CbCr space 700. In the example of the FIG. 7B, the block 751 is hierarchically subdivided into a set 752 of eight 'child' blocks. The subdivision corresponds to a hierarchical subdivision of the colour space 700. Each of the blocks in the set 752 corresponds to a region of the space 700 having a length of a half of a 'parent' region length in each dimension. In the example of the FIGS. 7A and 7B, the block 753 corresponds to the region 702. Each of the blocks of the set 752 may be further subdivided into a set of child blocks. In the example of the FIG. 7B, a block 754 is subdivided into a set 755 of eight child blocks. In the example of the FIGS. 7A and 7B, the block 756 corresponds to the region 704. A block that is not further subdivided into a set of child blocks is known as 'leaf' block.

A model may be associated with each of the blocks of the structure 750. Alternatively, it can be said that the model is associated with regions of the colour space 700. The model is used to map the input values (i.e. $Y_{linear}$, Cb and Cr) to an output Y value. Each model includes a number of coefficients. With a 'second order' model, seven coefficients are used to implement the model.

In the example of the FIG. 7B, a model 770 is associated with the block 756. When a $Y_{linear}$CbCr value is located in the region corresponding to the block 756, the model 770 is applied, even though the model associated with the block 754 could also be applied, as the block 754 was derived from a region that contains the region associated with the block 756. Having determined that the model (the 'parent model') for the region associated with the block 754 was inadequate and thus a split into sub-regions was necessary, it is possible to recalculate the model for the region associated with the block 754 excluding any child regions for which substantially better model (in the sense of reduced worst-case error) existed. However, it was found that rederiving the parent model in this way tended to increase the worst case error, due to the increased number of 'faces' in the region resulting from the more complex region shape due to exclusion of various sub-regions.

A single model may be associated with more than one block and hence with more than one region. In the example of the FIG. 7B a model 771 is associated with the block 754 and its child block 757 and a model 772 is associated with the blocks 758 and 759. The model 771 can be derived using the entire volume of the region associated with the block 754. In such a case, although the block 754 includes sub-blocks (e.g. 757-760), it is not necessary for each of the sub-blocks to have a separate model. The model 772 is shared between 'sibling' blocks 758 and 759. To support this sharing, the structure 750 includes a 'merge mode' where a given block, e.g. 759, can be indicated to use the model of a neighbour block, e.g. 758. Such an approach also permits a reduction in the number of models, and hence coefficients, required to be stored in the memory 206. A block may have no model associated with it, e.g. because the associated region has no valid $Y_{linear}$CbCr values. In the example of FIG. 7B, a block 760 has no associated model.

The model is used to map the input values (i.e. $Y_{linear}$, Cb and Cr) to an output Y value. Each model includes a number of coefficients. With a 'second order' model, seven coefficients are input to the model according to the following Equation (2):

$$Y_{final}=a*Y_{linear}^2+b*Y_{linear}+c*Cb^2 d*Cb+e*Cr^2+f*Cr+g \qquad (2)$$

where $Y_{final}$ the output Y luma value; a, b, c, d, e, f and g are the model input coefficients associated with a region; $Y_{linear}$, Cb and Cr are the coordinates of a point within the region.

A linear model (i.e. with the coefficients a, c and e always set to zero) provides a relatively poor approximation of the function resulting from the luma sample adjuster 600 due to the highly nonlinear nature of the transfer function present in the iterative loop. The introduction of the second order (i.e. quadratic) terms allows for improved modelling. As such, the number of regions required to obtain a close approximation of the luma sample adjuster 600 using a second-order model is less than would be the case for a linear model. The trade-off is the presence of additional multiplier logic to implement the quadratic terms. Experiments were also performed using higher order models, including third order and fourth order, however the additional improvement was deemed insufficient to justify the increase in complexity, both in terms of additional multiplication logic and in terms of storage for the increased number of coefficients associated with each model.

Figure 8A:
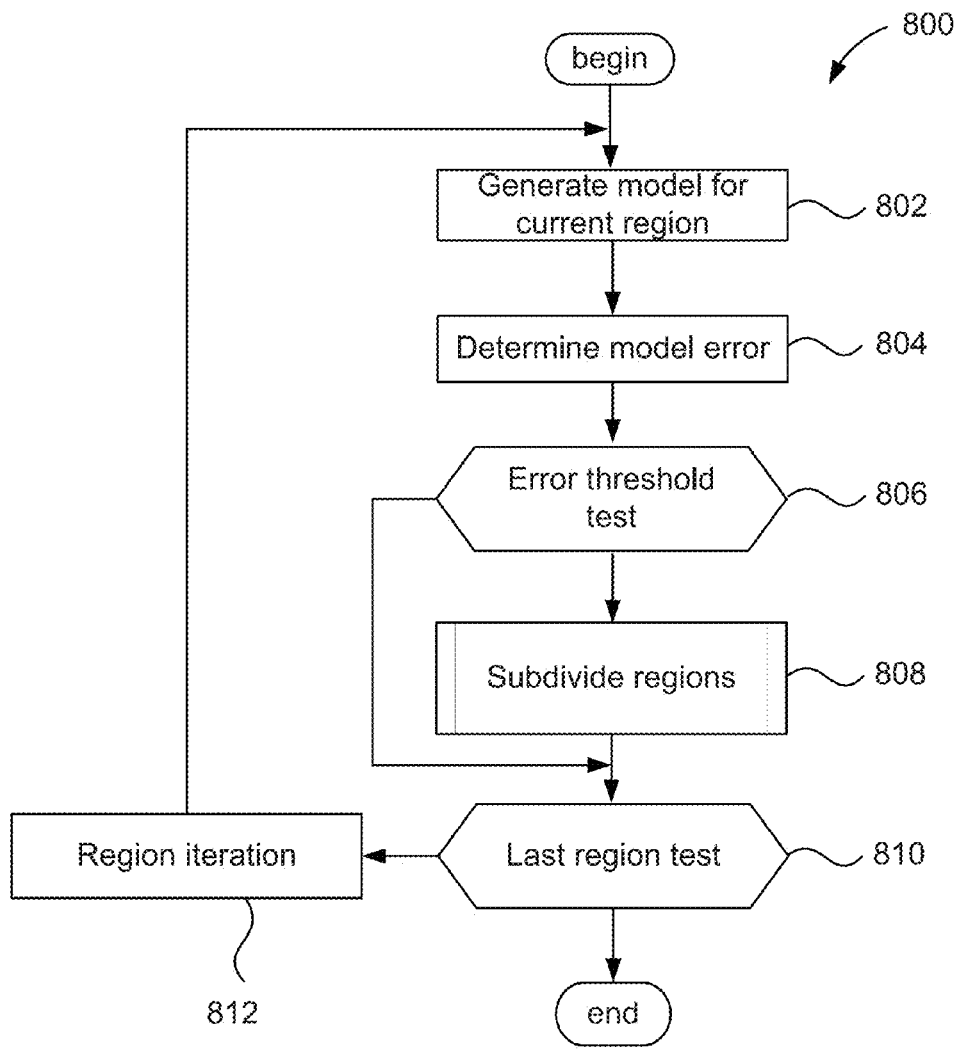
FIG. 8A shows a method of determining models associated with the regions of the octant hierarchy of FIG. 7A.

FIG. 8A shows a method 800 of determining models associated with the regions of the octant hierarchy of FIG.

7A. The method 800 results in a hierarchy of regions (e.g. as shown in FIG. 7B) and a set of models associated with each region. The method 800 may be implemented as one or more software code modules of the software application programs 233 resident in the hard disk drive 210 and being controlled in its execution by the processor 205.

The method 800 may be performed as an initialisation step, or may even be performed at a separate time and location (e.g. at design time), with the result stored in the memory 206 for later use at run time.

The method 800 begins by considering the entire colour space as one cube (i.e. a 'current region' occupies the entire colour space). The method 800 begins at a generating step 802, where model is generating for a current region. A set of points occupying a considered region is tested for under control of the processor 205 at step 802. Due to the large total number of possible points, the region is sparsely tested (e.g. by testing points spaced equally in each dimension). Note that the set of points may not occupy the full extent of the region because some $Y_{linear}$CbCr points are invalid (i.e. cannot result from valid R'G'B' input) and thus are unreachable, so the invalid points are excluded from the model generation. A least means square algorithm is used at step 802 to derive the coefficients of the region, using the tested points and using the result of the luma sample adjuster 600 as the desired values for $Y_{final}$. Control in the processor 205 then passes to a determining step 804.

At determining step 804, a model error is determined for the model generated at step 802, under control of the processor 205. The model error is a measure of the discrepancy between values produced by the model and the result of the iterative search as described with reference to FIG. 6. To obtain an accurate measure of the model error it is necessary to test many points within (and on the boundary of) the region to which the model applies. Thus, the model from step 802 is applied to a further set of points at step 804 in the currently considered region. The further set of points may be identical to the set of test points, or may represent a finer-granularity sampling of the currently considered region. For each point of the set of test points, an error value is measured, corresponding to the absolute difference between the value $Y_{final}$ and the result from the luma sample adjuster 600 for the current point. Then, for the currently considered region, a worst-case error is determined as the overall error value for the currently considered region. Alternatively, other, less severe, measures of error may be used, such as the average error of all tested points. Control in the processor 205 then passes to an error threshold testing step 806.

At step 806, the error from the step 804 is compared with a threshold value under control of the processor 205. The threshold value is a predetermined value indicative of the maximum permitted error for a given model and region. In one arrangement, the threshold value is selected to be equal to the just noticeable distortion (JND) value. If the threshold is exceeded at step 806, it is deemed that the model is inadequate to generate usable values for $Y_{final}$. In this case, control passes to a region subdividing step 808. Alternatively, control passes to a last region testing step 810. To avoid excessive subdivisions, a limit may be placed on the maximum permitted depth of subdivisions, in which case the smallest-permitted regions (e.g. 64×64×64) may have error values that exceed the threshold value.

At the region subdividing step 808, the currently considered region is subdivided into eight smaller regions, in accordance with an 'octant hierarchy'. The eight smaller regions are realised by dividing the current cubic region in half in each dimension. It is also possible to have subdivisions other than halving, in which case region thresholds are also output by the region subdividing step 808, for storage in the memory 206, to enable later identification of a region to which a given point belongs. The method 800 is invoked for each of the resulting regions. Once step 808 completes, control in the processor 205 passes to the step 810.

At step 810, if any of the volume of the colour space of FIG. 7 has not yet been assigned a region and associated model, then the method 800 terminates. Alternatively, a next region for processing is selected at selecting step 812 and control in the processor 205 returns to step 802.

As the method 800 progresses through determining models and regions, a map is maintained (e.g., within memory 206) enabling any point in the colour space of FIG. 7A to be associated with the region in which the point is contained. In the case of uniform splitting (i.e. each region is always subdivided equally in each dimension), inspection of most significant bits of each of $Y_{linear}$, Cb and Cr is sufficient to identify the region of the point in $Y_{linear}$CbCr space. In the case of non-uniform subdivision, it is necessary to recursively compare the Y, Cb and Cr values with the subdivision boundaries in order to descend through the octant hierarchy to the final region. The limit on octant hierarchy depth imposes a worst-case limit on the complexity of identifying a region to which a given point belongs. As a result of the method 800, a set of models is produced, each model being associated with a particular region in the colour space. The determined models and associations may be stored in the memory 206, or stored in on-chip SRAM for fast access for real-time implementations. Moreover, the determined models and associations may be determined at design time and stored in the encoding device 110 for use when performing chroma downsampling.

In one arrangement of the method 800, each region in the octant hierarchy has an associated 'active region' flag, including regions that are further subdivided into smaller regions. The active region flag indicates that a model is associated with the active region. If a point is determined to lie within a region that does not have an associated model, then the model of the first ancestor region to have an associated model is used. As such, if the recursion process determines that a region should be split, it is possible that some of the resulting regions offer no substantial improvement upon the model derived for the earlier region. In this case, the child regions can have the 'active region' flag set to indicate that an ancestor region is used instead. This situation can occur because the error from step 804 is often concentrated in small portions of a region, so the requirement to split the region into subregions may only result in an improvement in a small portion of the region (e.g. in one sub-region). Use of ancestor regions reduces the requirement to store many more models (e.g. for the other seven sub-regions) in the memory 206, as a model associated with a region may also be use by sub-regions. Such arrangements therefore afford a reduction in the memory consumption for storage of coefficients, due to the reduced number of required models.

Figure 8B:
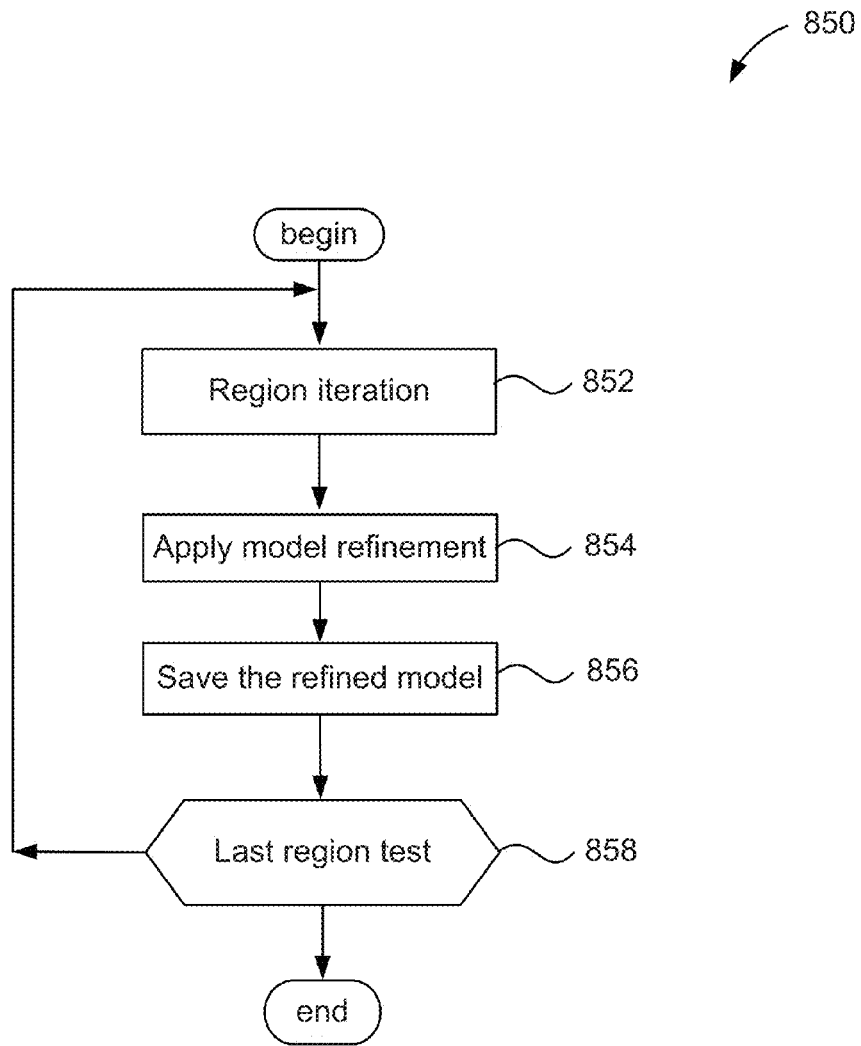
FIG. 8B shows a method of refining models associated with the regions of the octant hierarchy of FIG. 7A.

FIG. 8B shows a method 850 of refining models associated with the regions of the octant hierarchy of FIG. 7A. In particular, the collection of models generated in the method 800 may be considered as a 'first approximation' of the final result. This first approximation was produced by uniformly sampling cubic sub-regions of the colour space (i.e. two dimensions for colour and the third for luminance). Although this uniform sampling gives equal weight to all regions in the colour space, difficulties in producing accurate models were found in some cases. In particular, cases involving small 'cubes' (e.g. as seen at very low luminances) have larger degrees of colour shift within the cube, which is difficult to model, even at relatively high sampling rates within the cube. The models may be improved by applying a 'refinement' process to the models. The refinement process takes the models produced from the method 800 as a starting point and performs further searching to make adjustments to further improve the resulting performance.

In one aspect, instead of uniformly sampling subregions of the colour space, test data from a wide variety of test sequences of video data is used where the test data may be images, selected from the test sequence. One benefit of using test data from a wide variety of test sequences is that the degree of model refinement is dependent on the degree to which the test data occupies the colour space, and the frequency of use of different regions within the colour space. Using test data can be prone to producing results that are optimal for a given set of test data, but performs worse for other test data, a phenomena known as 'over-fitting'. In the case of 'over-fitting', the use of a uniform sampling process from the method 800 results in a model having no bias towards any region in the colour space, and that achieves a particular minimum level of performance. Then, to the extent that the test data occupies the colour spaces, the models of the method 800 are further improved, i.e. the result of using the models of the method 800 is brought closer to the results of a brute-force search for the optimal values. In this sense, the refinement algorithm has a property of being able to improve the performance of the models associated with each cube, without necessarily incurring a penalty on some other data set. This property of the refinement method may be used to perform multiple passes of coefficient refinement with different video data being used as a source of test data.

The method 850 applies a refinement algorithm to models produced by the method 800. The method 850 may be implemented as one or more software code modules of the software application programs 233 resident in the hard disk drive 210 and being controlled in its execution by the processor 205.

At a selecting step 852, a next region is selected for processing under execution of the processor 205. In particular, an octant decomposition of the colour space was determined in the method 800 that divides the colour space into a set of regions, of differing sizes according to the depth in the octant hierarchy. The method 850 refines the coefficients for the model associated with each region in the octant hierarchy and, as such, does not alter the structure of the octant hierarchy itself. Then, a pass through of each region is performed, with the step 852 advancing consideration to the next region to be processed of the available regions. When the next region is selected, the initial coefficients for the region are also selected.

At an apply model refinement step 854, a cost-based multidimensional function minimization algorithm, such as the Nelder-Mead algorithm, is applied to the model associated with the region selected at the step 852. The minimization algorithm uses coefficients, also referred to as initial coefficients, of the model produced by the method 800 as initial coefficients and performs a number of iterative modifications of the initial coefficients to minimize a given cost function. The particular cost function used is described further with reference to FIG. 8C below. The cost function is applied to all sample points from the available test sequences that fall within the region under consideration (i.e. the region selected in the step 852). The ability of the model to predict the correct linear luminance for each sample point is what is being improved in accordance with the step 854.

As the available test data does not uniformly occupy the regions in the octant hierarchy, it is evident that some regions are more heavily processed than others. However, the less-processed regions can also be optimised further with application of a wider set of test data. In this sense, the performance improvement achieved from the method 850 does not come at the expense of reduced performance when other test sequences (i.e. outside of those used in the refinement process) are used.

At a save the refined model step 856, the model resulting from the minimization algorithm of the step 854 is associated with the region selected at the step 852, under execution of the processor 205, replacing the previously associated model (i.e the model derived from the method 800). At the save model step 856 the initial coefficients of the model, associated with the region, are modified and the modified coefficients are stored for the region.

At a last region test step 858, if any regions are remaining to be processed in the model hierarchy, then control in the processor 205 passes to the step 862. Otherwise, the method 850 terminates.

Figure 8C:
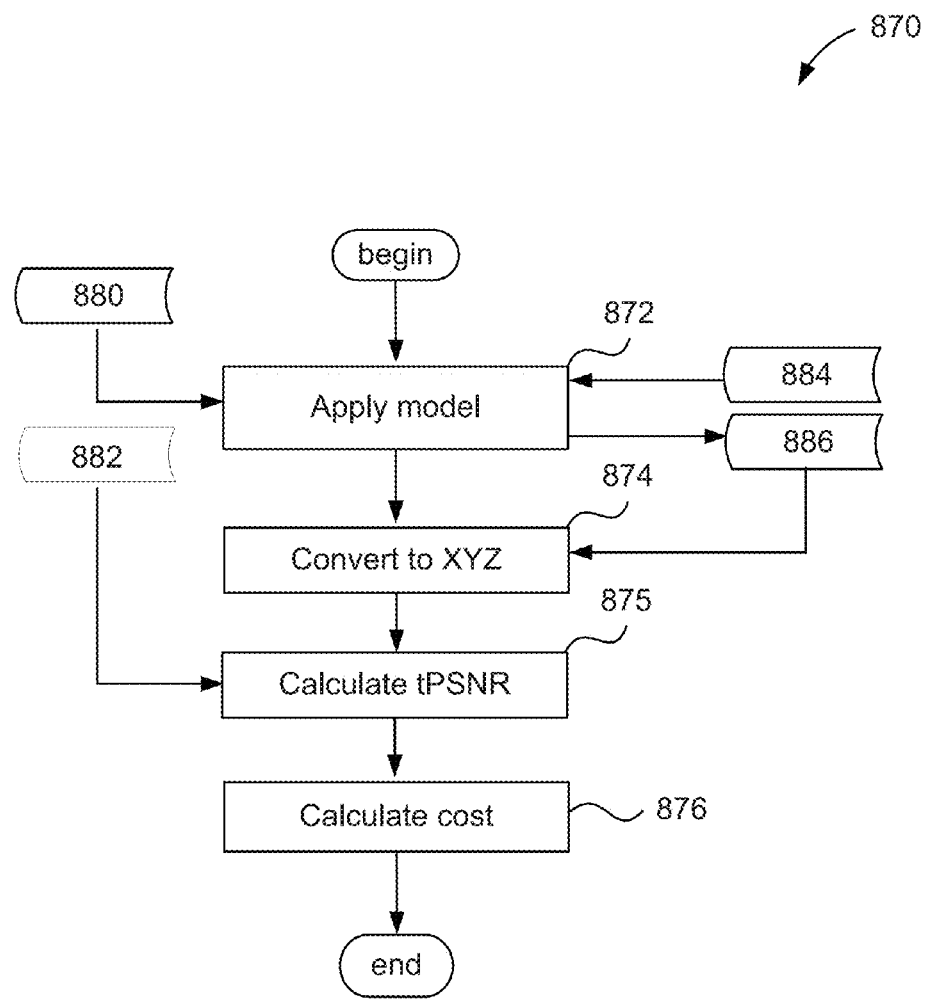
FIG. 8C shows a cost estimation method that may be used as cost function by the minimization algorithm of the method of FIG. 8B.

FIG. 8C shows a cost estimation method 870. The method 870 may be used as cost function by the minimization algorithm of the apply model refinement step 854 of the method 850. Although operating on values representative of linear light intensities, the cost estimation method 870 measures costs in a perceptually uniform domain. As a result, the costs do not map linearly back to the degree of distortion present in the linear light domain. However, the measured costs are strongly correlated with the degree of distortion that would be perceived by a human when asked to evaluate the result produced from the model under test. The method 870 may be implemented as one or more software code modules of the software application programs 233 resident in the hard disk drive 210 and being controlled in its execution by the processor 205.

The method 870 starts with an apply model step 872. The apply model step 872 makes use of coefficient values 880, determined from the minimization algorithm of the step 854 of the method 850. A calculate tPSNR step of the method 870 makes use of test data 882 in the XYZ colour space. The apply models step 872 also makes use of downsampled test data 884 in the YCbCr colour space, the downsampled test data 884 being derived from the test data 882 by performing a conversion from the XYZ colour space to the linear RGB colour space and applying the non-constant luminance conversion process as described above with the reference to the FIG. 5, in addition to downsampling. The test data 882, which is an image, may be referred to as an initial image while the downsampled test data 884 may be referred to as a test image.

At the apply model step 872, the model comprising the coefficient values 880 is applied to the downsampled test data 884, under execution of the processor 205, to produce a luma-adjusted video data 886 in the YCbCr colour space.

At a convert to XYZ step 874, the video data 886 is converted from the YCbCr colour space to the XYZ colour space by applying an inverse non-constant luminance conversion process.

At a calculate tPSNR step 875, a 'tPSNR' objective video quality metric of the video data output from the convert to XYZ step 874 is determined. To calculate a measure of quality of the test sequence, the downsampled test data 884 from the step 874 is compared to the test data 882 at step 875. The tPSNR metric is similar to the PSNR metric applied to measure distortion in the linear light domain, except that in this case the linear light is first transformed into a 'perceptual' domain, e.g. through application of a perceptually uniform transfer function such as the PQ-EOTF, as specified in SMPTE ST 2084. Note that measuring tPSNR gives a nonlinear error measure in the linear light domain. However, the measured errors more closely approximate the degree of distortion that would be perceptible to a human observer. The step 875 produces three positive numeric values tPSNR$_X$, tPSNR and tPSNR$_Z$ having units of decibels (dB) and corresponding to the X, Y and Z dimensions of the XYZ colour space.

At a calculate cost step 876, a cost value is calculated according to the following Equation (2a):

$$COST = -(tPSNR_X * w_X + tPSNR_Y * w_Y + tPSNR_Z * w_Z) \quad (2a)$$

where tPSNR$_X$, tPSNR$_Y$ and tPSNR$_Z$ are the tPSNR values produced by the calculate tPSNR step 875; $w_X$, $w_Y$ and $w_Z$ are predetermined weight factors and COST is the cost value returned by the method 870. The cost value is returned as the result of calling the cost function (i.e the method 870).

In an arrangement of the method 870 the weight factors $w_X$, $w_Y$ and $w_Z$ have values one (1), one (1) and one (1) correspondingly. In this case, the objective quality of both the luminance component (Y) and the colour components (X and Z) are used as the feedback to the refinement algorithm of the step 854. Therefore the refinement algorithm of the step 854 will perform model coefficient refinement with regards to all three components, usually resulting in objective quality improvement in all three components (X, Y, Z)

In another arrangement of the method 870, the weight factors $w_X$, $w_Y$ and $w_Z$ have values zero (0), one (1) and zero (0) correspondingly. In this case, only the objective quality of the luminance component (Y) is used as the feedback to the refinement algorithm of the step 854. Therefore, the refinement algorithm of the step 854 will perform model coefficient refinement with regards only to the luminance component, usually resulting in larger objective quality improvement in the luminance component compared to the previous arrangement, but little or no improvement in the colour components. The arrangement where the weight factors $w_X$, $w_Y$ and $w_Z$ have values zero (0), one (1) and zero (0), correspondingly, may be beneficial in cases where only the quality of the luminance component needs to be improved as much as possible while the quality of the colour components does not need to be improved. In one arrangement, the test sequence may be a video bitstream that is to be shown to viewers. During the mastering stage of the video bitstream the coefficents associated with the regions of the colour space are stored as metadata associated with the video bitstream. Using the video bitstream as the test sequence allow for coefficients to be customized for viewing the video bistream. Alternatively, a generalised test sequence may be used to determined coeffcients for use with a range of video bistreams.

Figure 9:
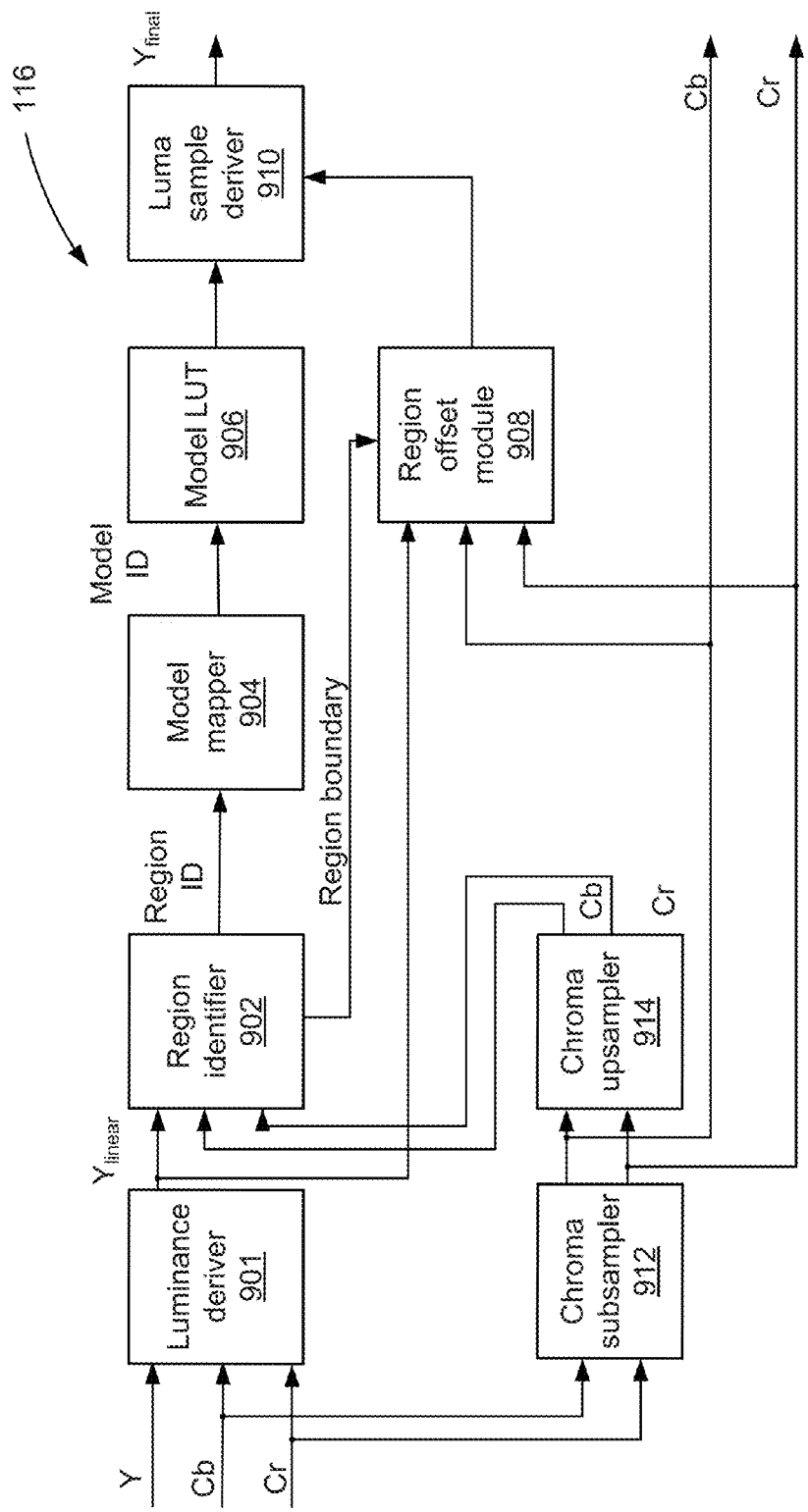
FIG. 9 shows a schematic block diagram of the chroma downsampler of FIG. 1.

FIG. 9 shows a schematic block diagram of the chroma downsampler 116. The chroma downsampler 116 operates on each sample of the frame 300, taking YCbCr input data. As seen in FIG. 9, a luminance deriver module 901 determines the linear luminance of a pixel of YCbCr input data. However, it is insufficient to consider just the 'Y' channel to obtain the luminance. The Cb and Cr channels also need to be considered. The output of the luminance deriver module 901 is representative of the linear light level and, as such, can be an encoding of the full supported dynamic range (e.g. up to 10000 nits for PQ) using integer precision. In one arrangement of the chroma downsampler 116, the output of the luminance deriver module 901 is itself encoded using the PQ transfer function.

A region identifier module 902 determines which region a given chroma sample belongs to in the $Y_{linear}$CbCr colour space. The input to the region identifier module 902 is the linear light value from the luminance deriver 902 and subsampled chroma samples from a chroma subsampler module 912. The chroma subsampler module 912 can provide various filters with different degrees of 'sharpness' (i.e. roll-off in the frequency domain). The subsampled chroma output from the chroma subsampler module 912 is then passed to a chroma upsampler module 914.

The chroma upsampler module 914 applies interpolation filters to upsample the chroma from the 4:2:0 chroma format to the 4:4:4 chroma format. The particular filters applied are signalled in the encoded bitstream 132 using the Chroma resampling filter hint SEI message. Consequently, the upsampled chroma samples output from the chroma upsampler module 914 correspond to the decoded 4:4:4 video data 172. Then, the upsampled chroma, along with the linear light value $Y_{linear}$, is used to identify a point in the octant hierarchy. For uniformly-spaced subdivision in the octant hierarchy, a point in the octant hierarchy is identified by by inspecting the most significant bits in descending order for each codeword to determine the region to which the sample belongs. The result is a region identifier (ID) which is passed to a model mapper module 904. The region identifier module 902 also produces a region boundary. The region boundary is simply the co-ordinates of the region in the three dimensional space afforded by the bit depth of the codewords.

The model mapper module 904 provides a look-up table (LUT) mapping a region ID to a model identifier (ID). The LUT allows for multiple regions to have the same model. In some arrangements, the relationship between a region ID and a model ID is a one-to-one relationship. In arrangements where relationship between a region ID and a model ID is a one-to-one relationship, the model mapper module 904 is effectively bypassed, or not present, as no functionality is provided by the module 904.

In other arrangements, the region ID is the smallest supported octant (or cube) size, and larger effective regions are achieved by having multiple region ID values mapping to a single model ID value. Arrangements where the region ID is the smallest supported octant (or cube) size provides the benefit of reduced memory consumption, as fewer models are stored compared to storing a model for each of the smallest octant size.

In an arrangement of the module 904, if a region does not have a model associated with it, then the module 904 will use a model from a parent region.

A model LUT module 906 contains the coefficients for each model, selectable via the model ID. Generally, the model LUT module 906 is configured within the memory 206, although the model LUT module 906 may also be configured within on-chip SRAM for fast access (e.g. at the pixel rate of the encoding device 110).

A region offset module 908 determines the offsets of the $Y_{linear}$CbCr point within the selected region (i.e. relative to the region boundary as provided by the region identifier module 902). The offsets are the offset in each dimension (i.e. $Y_{linear}$, Cb$_{offset}$ and Cr$_{offset}$) relative to the region (cube) boundary in each dimension (i.e. $Y_{region}$, Cb$_{region}$, Cr$_{region}$). Input is the subsampled chroma samples and $Y_{linear}$.

The resulting offsets are passed to a luma sample deriver 910, where the resulting offsets are applied with the model coefficients from the model LUT 906. Use of a second order model results in the Equation (3), as follows, for deriving the output $Y_{final}$:

$$Y'_{final} = a*Y_{offset}^2 b*Y_{offset} c*Cb_{offset}^2 d*Cb_{offset} e*Cr_{offset}^2 f*Cr_{offset} g \quad (3)$$

Generally, the luma sample deriver 910 is implemented using integer arithmetic for reduced complexity, and so bit shifts are also present to rescale the final value to the normalised range afforded by the bit depth of the codewords. The bit depth of $Y_{final}$ matches the bit depth of the video encoder 118. However, the bit depth for intermediate data (i.e. resulting from evaluation of equation (3) above) may be wider than the bit depth of the video encoder 118 to reduce errors resulting from loss of precision of intermediate results. When using the 4:2:0 chroma format, the chroma downampler is generally applied to sets of 2×2 Cb and 2×2 Cr input samples to produce a pair of output samples (i.e. one Cb and one Cr sample). The chroma downsampler may take source sets of Cb and Cr samples from an area wider than 2×2, depending on the selected filter tap coefficients of the subsampling operation.

The remaining modules in the chroma downs ampler module 116 operate at the pixel rate, which in the case of YCbCr in 4:2:0 corresponds to the rate at which Y samples arrive. In the chroma downsampler 116, the 'true' or intended luminance of each pixel is known, and this information is used to adjust the final Y sample output to accommodate for residual luminance information present in the downsampled Cb and Cr samples, that is shared amongst four luma samples.

Figure 10:
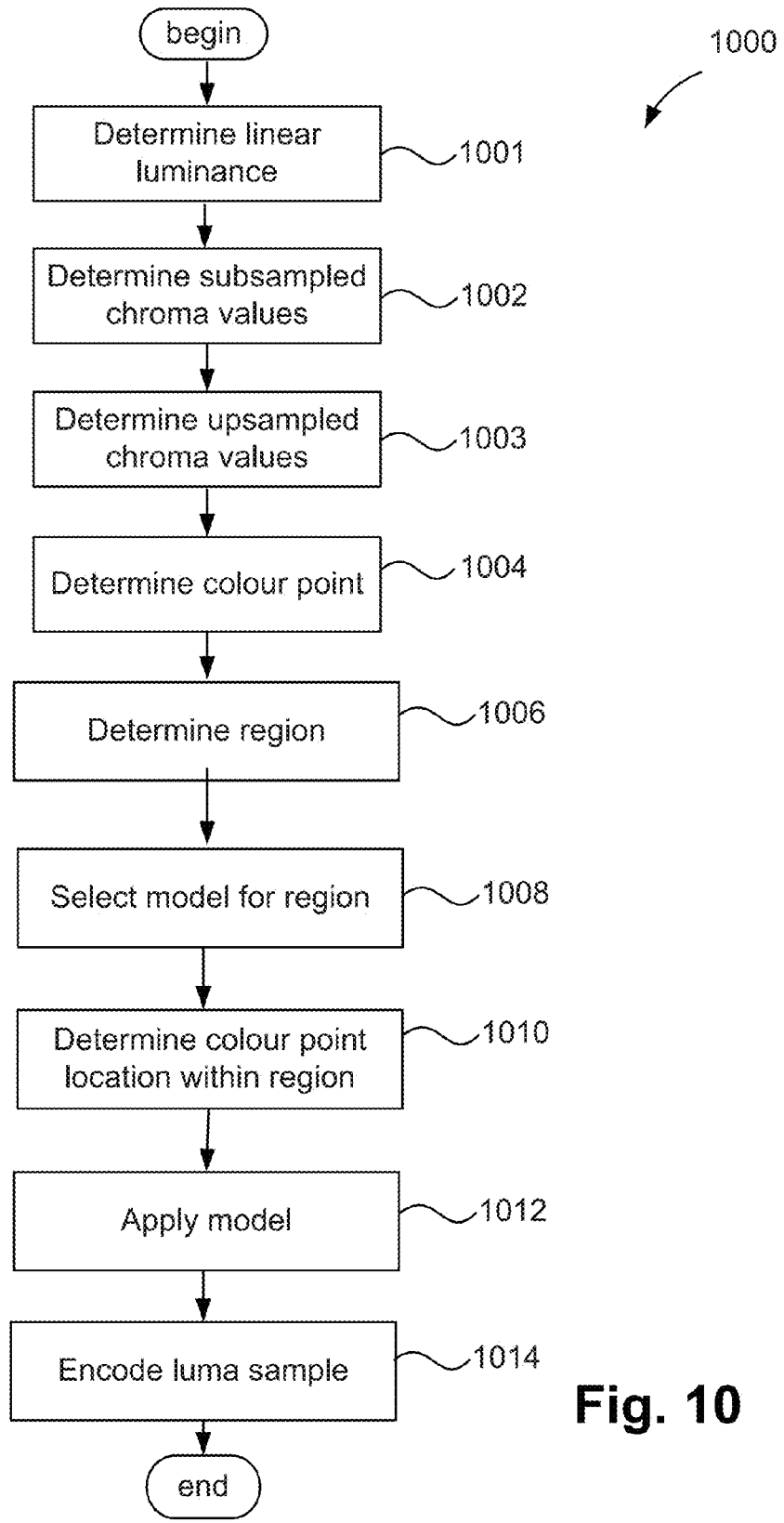
FIG. 10 shows a method for performing chroma downsampling.

FIG. 10 shows a method 1000 for performing chroma downsampling. The method 1000 may be implemented as one or more software code modules of the software application programs 233 resident in the hard disk drive 210 and implementing the encoding device 110.

The method 1000 is described by way of example for the hardware modules as described with reference to FIG. 9. However, the steps of FIG. 10 *d* can also show the control flow were the modules of FIG. 9 are implemented as software routines. The method 1000 is invoked for each luma sample in a frame such as the frame 300 of FIG. 3A. The method 1000 may be used for determining a luma value from 4:4:4 RGB video data for encoding chroma downsampled 4:2:0 YCbCr video data into a bitstream.

The method 1000 is described by way of example with reference to the frame 300. The method 1000 begins with a determining linear luminance step 1001, where a linear luminance value, $Y_{linear}$, is determined. The linear luminance is determined by the luminance deriver 901, under control of the processor 205. The linear luminance is determined for a given pixel input to the chroma downsampler 116 (e.g. as YCbCr data in the 4:4:4 chroma format). The linear luminance may be determined by converting the YCbCr data back to R'G'B', then applying the PQ-EOTF to each component to produce RGB. The RGB is then converted to CIE1931 XYZ. Of the final XYZ values, only the luminance is further considered. Control in the processor 205 then passes to a determining subsampled chroma values step 1002.

At step 1002, the chroma subsampler 912, under control of the processor 205, performs a subsampling operation on the Cb and Cr samples in the 4:4:4 chroma format to produce subsampled chroma values in the form of Cb and Cr samples in the 4:2:0 chroma format. Step 1002 may be achieved through application of a simple linear filter. Alternatively, more complex (i.e. more filter tap) filters may be used at step 1002, generally having a sharper roll-off in the frequency domain, to hasten the transition from one chroma value to another chroma value, when considering a run of chroma sample values. Such hastening is beneficial to reduce the amount of intermediate chroma sample values, which actually represent 'new' colours not present in the 4:4:4 video data. Although the method 1000 is invoked for each luma (Y) sample, step 1002 may be performed for every 2×2 group of luma samples. For example, in the example of FIG. 3A, the result of the step 1002 is shared among the group of luma samples 302. Control in the processor 205 then passes to a determining upsampled chroma values step 1003.

At step 1003, the chroma upsampler module 914, under control of the processor 205, determines upsampled chroma values. A defined set of chroma upsampling filters is applied to convert 4:2:0 video data from the chroma subsampler 912 to 4:4:4 video data. The 4:4:4 video data output from the chroma upsampler 914 differs from the 4:4:4 video data input to the chroma subsampler 912, due to the loss resulting from the intermediate 4:2:0 representation. The filtering applied in the chroma upsampler 914 accords with signalling present in the encoded bitstream 132 and contained in the Chroma resampling filter hint SEI message. Examples of upsampler approaches include 'nearest neighbour' and bilinear filtering. Regardless of the approach used, the chroma upsampler 164 in the display device 160 should use the same approach as used in the chroma upsampler module 914. Using the same approach ensures that the luma sampler deriver 910 operates using the same chroma sample values as seen in the display device 160. In some application scenarios the chroma sample filters may be predefined, in which case there is no need to explicitly signal the Chroma resampling filter hint SEI message in the encoded bitstream 132. Control in the processor 205 then passes to a determine colour point step 1004.

Then at determining colour point step 1004, a colour point is determined under control of the processor 205. The $Y_{linear}$ value determined at step 1001 and the subsampled chroma values from the step 1002 are assembled at step 1004 to produce a value $Y_{linear}CbCr$ that represents a point in a space, termed here a 'colour space' but not corresponding directly to other well-known colour spaces such as YCbCr. The colour space may be defined by linear luminance and non-linear 4:2:0 chroma values.

The $Y_{linear}$ value is generally considered to have a large dynamic range mandating use of floating-point storage. However, a compressed representation (e.g. as achieved with the use the PQ-EOTF), enables an integer format to be used. For 4:4:4 input video data and 4:2:0 output, step 1004 is applied to each of the four $Y_{linear}$ values associated with the upsampled chroma samples from the chroma upsampler module 914. For arrangements supporting a '4:2:2' chroma format, there are two Ylinear values associated with a pair of subsampled CbCr values, and the iteration is modified accordingly, as is the chroma downsampler module 912. Control in the processor 205 then passes to a determining region step 1006.

At determining step 1006, the region identifier module 906, under control of the processor 205, determines the region within the hierarchy of regions resulting from the method 800 which contains the value $Y_{linear}CbCr$. The determined region is one region of a plurality of regions located in the colour space and has a plurality of associated coefficients as described above with reference to FIG. 8. Control in the processor 205 then passes to a selecting model for region step 1008.

At step 1008, the model mapper 904, under control of the processor 205 selects a model identifier (ID) associated with the region identified from the step 1006. The model ID is an index into a table of models configured, for example, within memory 206. Each model includes a set of coefficients (e.g. seven coefficients for a second-order model). Steps 1006 and 1008 may be said to select coefficients for a given region, as the coefficients for the applicable model are available from the memory 206. Control in the processor 205 then passes to a determining colour point location within region step 1010.

At the determining colour point location within region step 1010, the region offset module 908, under control of the processor 205, determines the location (or 'offset') of the colour point, $Y_{linear}CbCr$, in the region determined from step 1006. At step 1010, the offset of the $Y_{linear}CbCr$ point within the region of the step 1006 is determined. The offset is a vector having three dimensions corresponding to $Y_{linear}$, Cb and Cr. Generally, the unit of each component of the offset vector is one codeword. Control in the processor 205 then passes to an apply model step 1012.

At the applying model step 1012, the model LUT 906 and the luma sample deriver 910, under control of the processor 205, are used to determine an output luma sample $Y_{final}$ for use by the video encoder 118. The model ID from the step 1008 is used to index the selected model from the model LUT 906, determining the coefficients associated with the selected model. The determined coefficients represent a model which maps the space within the selected region from the input vector of $Y_{linear}$, Cb and Cr to the output $Y_{final}$ value. As the determined coefficients are the result of a search process (e.g. a recursive least-mean algorithm as described with reference to FIG. 8), the coefficients provide a close approximation to slower iterative methods for obtaining $Y_{final}$. Then, the luma sample deriver 910 applies the coefficients of the model to the offset vector. The resulting value $Y_{final}$, is then passed, along with the associated Cr and Cb samples, to the video encoder 118. Control in the processor 205 then passes to an encode luma sample step 1014.

At encoding luma sample step 1014, the video encoder 118, under control of the processor 205, is used for encoding the luma sample value resulting from the step 1012 into the encoded bitstream 132. The associated subsampled chroma samples resulting from the step 1002 are also passed to the video encoder 118. The method 1000 then terminates.

An alternative arrangement of the method 1000 will now be described below with reference to the FIG. 11.

Figure 11:
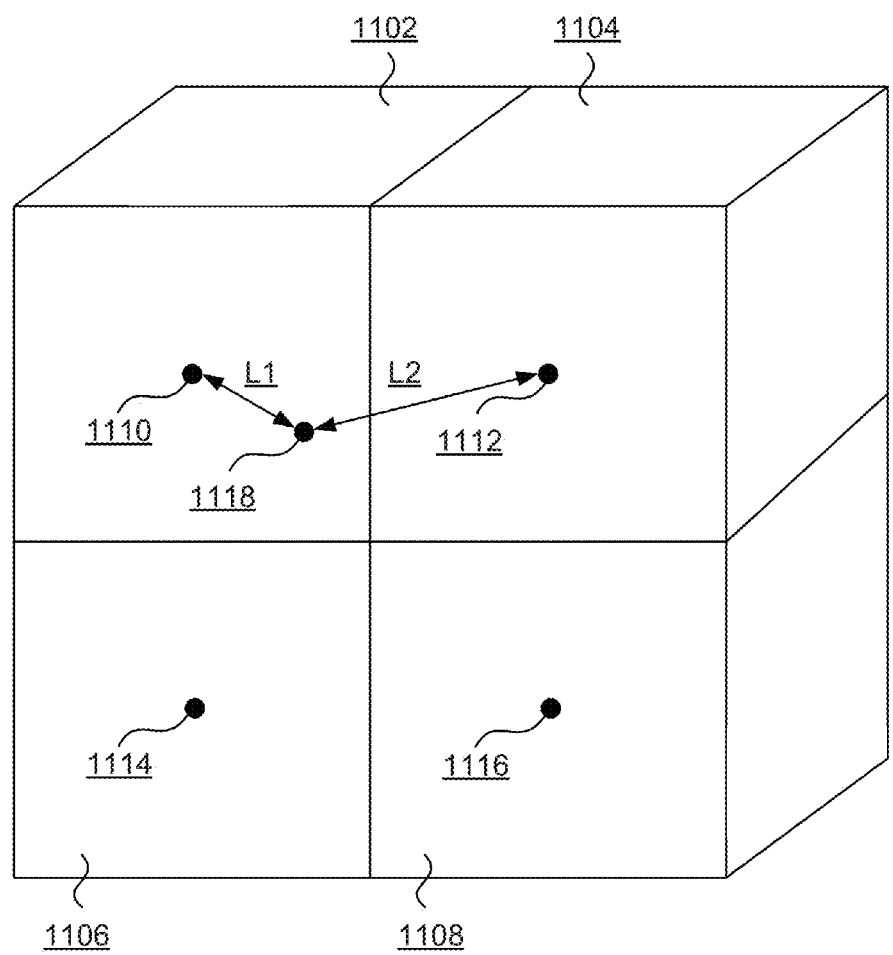
FIG. 11 is a schematic diagram showing an example configuration of colour space regions.

FIG. 11 is a schematic diagram showing an example configuration 1100 of colour space regions 1102, 1104, 1106 and 1108 with centers 1110, 1112, 1114, 1116 respectively. The regions 1104, 1106 and 1108 are adjacent to the region 1102. A $Y_{linear}CbCr$ point 1118 is located within the region 1102.

In the arrangement of FIG. 11, at the step 1006, the region identifier module 902, under control of the processor 205, determines the region within the hierarchy of regions resulting from the method 800 which contains the value $Y_{linear}CbCr$. The region determined at step 1006 is the region 1102 in the example of FIG. 11. The region identifier module 906, under control of the processor 205, then determines an adjacent region closest to the point 1118, which is the region 1104 in the example of the FIG. 11. Next, the region identifier module 902, under control of the processor 205, uses a proximity metric (e.g. Euclidean distance) to determine distances L1 and L2 from the point 1118 to the center 1110 of the region 1102 containing the point 1118 and the center 1112 of the closest neighbour region 1104. Control in the processor 205 then passes to a selecting model for region step 1008.

For the arrangement of FIG. 11, at the select model input coefficient set for region step 1008, the model mapper 904, under control of the processor 205 selects model IDs of all the models associated with the regions identified from the step 1006 (i.e., regions 1102 and 1104 in the example of the FIG. 11). Control then passes to a determining colour point location within region step 1010.

At the determining colour point location within region step 1010, for the arrangement of FIG. 11, the region offset module 908, under control of the processor 205, determines the location of the colour point, $Y_{linear}CbCr$, in the region containing the point. At step 1010, the offset of the $Y_{linear}CbCr$ point within the containing region (the region 1102 in the example of the FIG. 11) is determined. The offset is a vector having three dimensions corresponding to $Y_{linear}$, Cb and Cr. Generally, the unit of each component of the offset vector is one codeword. Control in the processor 205 then passes to an apply model step 1012.

At the apply model step 1012, for the arrangement of FIG. 11, the model LUT 906 and the luma sample deriver 910, under control of the processor 205, are used to produce an output luma sample $Y_{final}$ for use by the video encoder 118. The model input coefficient set IDs from the step 1008 are used to index the selected model input coefficient set from the model LUT 906, obtaining the coefficients associated with the regions 1102 and 1104. Next, the luma sample deriver 910 applies each of the models associated with the regions 1102 and 1104 to the offset vector to obtain two resulting values $Y_{final-1}$ and $Y_{final-2}$ for the regions 1102 and 1104 correspondingly. The model LUT 906 and the luma sample deriver 910, under control of the processor 205, then use a weighted sum according to the Equation (4) below to determine the $Y_{final}$ value:

$$Y_{final}=(L2*Y_{final-1}L1*Y_{final-2})/(L1+L2) \quad (4)$$

The resulting value $Y_{final}$, is then passed, along with the associated Cr and Cb samples, to the video encoder 118. Control in the processor 205 then passes to an encode luma sample step 1014.

Figure 12A:
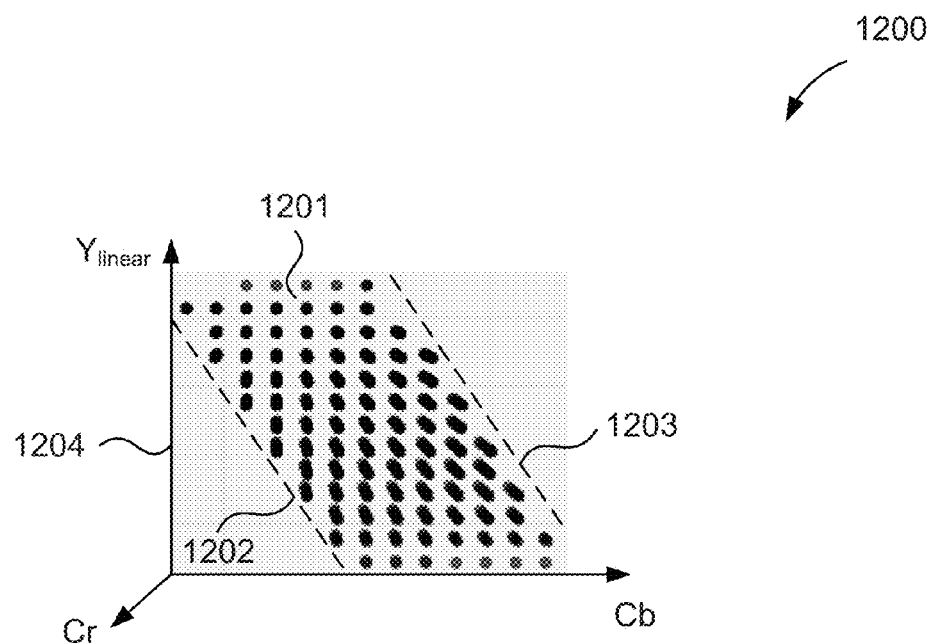
FIGS. 12A and 12B are schematic diagrams showing a mapping of an RGB colour space into the $Y_{linear}CbCr$ colour space.
Figure 12B:
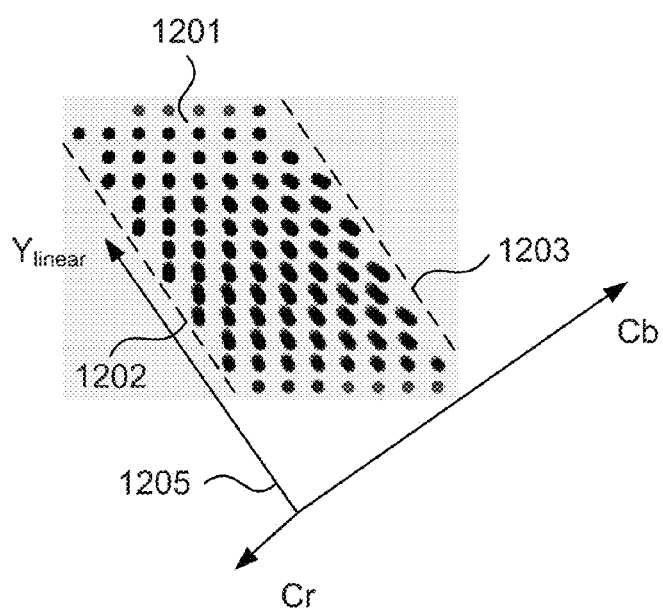

FIG. 12A is a schematic diagram 1200 showing a mapping of an RGB colour space 1201 into the $Y_{linear}CbCr$ colour space. Boundaries 1202 and 1203 of the RGB colour space 1201 are not aligned with axes 1204 of the $Y_{linear}CbCr$ colour space. As a result, the method 800 of determining models associated with the regions of the octant hierarchy may perform excessive region subdivisions at the step 808. In an alternative arrangement, the $Y_{linear}CbCr$ colour space is rotated, as shown on the FIG. 12B, so that the axes 1205 of the $Y_{linear}CbCr$ colour space are better aligned with the boundaries 1202 and 1203 of the RGB colour space 1201. In the arrangement of FIG. 12B, where the $Y_{linear}CbCr$ colour space is rotated, the number of region subdivisions performed by the method 800 may be reduced without increasing model error, leading to a reduction in the amount of memory 206 needed to store the models associated with the regions.

Arrangements disclosed herein provide for a video system that encodes and decodes video content that has been subsampled, e.g. to the 4:2:0 chroma format, with compensation for deviations in the luminance of each pixel that would otherwise be present in a conventional chroma downsampler. For HDR applications using highly nonlinear transfer functions, such as PQ-EOTF, the deviations are more significant than in traditional SDR applications. Moreover, the methods described herein operate with fixed complexity per pixel and with complexity commensurate with hardware implementation (e.g. for real-time systems).

Notwithstanding the above description of a system operation with the source material 112 in the 4:4:4 chroma format and the video encoder 118 configured to encode video data in the 4:2:0 chroma format, source material 112 in other chroma formats, such as 4:2:2 may also be used. Moreover, source material 112 that is in an interlaced format may be used, with the chroma upsampling filter alternating between the top and bottom fields.

INDUSTRIAL APPLICABILITY

The arrangements described are applicable to the computer and data processing industries and particularly for the digital signal processing for the encoding a decoding of signals such as video signals.

The foregoing describes only some embodiments of the present invention, and modifications and/or changes can be made thereto without departing from the scope and spirit of the invention, the embodiments being illustrative and not restrictive.

The invention claimed is:

1. A method of determining luma values from 4:4:4 RGB video data for encoding chroma downsampled 4:2:0 YCbCr video data into a bitstream, the method comprising:
   determining initial coefficents for a region of a colour space, the region being one of a plurality of regions located in the colour space and each region having a plurality of associated coefficients;
   applying the determined initial coefficients to an initial image to produce a test image, the test image being a chroma downsampled 4:2:0 YCbCr version of the initial image;
   determining a measure of quality by comparing the initial image and the test image;
   modifying the determined initial coefficients to increase the determined measure of quality; and
   determining luma values from 4:4:4 RGB video data for encoding chroma downsampled 4:2:0 YCbCr video data into a bitstream using the modified coefficients.

2. The method according to claim 1 wherein the measure of quality is determined by applying a Perceptual Quality transfer function to the initial image and the test image in a linear RGB colour space.

3. The method according to claim 1 wherein the measure of quality is determined using a weighted combination of measures of quality of colour channels for the initial image and the test image.

4. The method according to claim 1 wherein the determined initial coefficients are modified using Nelder-Mead minimization.

5. A system for determining luma values from 4:4:4 RGB video data for encoding chroma downsampled 4:2:0 YCbCr video data into a bitstream, the system comprising:
   a memory for storing data and a computer program;
   a processor coupled to the processor for executing said computer program, said computer program comprising instructions for:
   determining initial coefficents for a region of a colour space, the region being one of a plurality of regions located in the colour space and each region having a plurality of associated coefficients;
   applying the determined initial coefficients to an initial image to produce a test image, the test image being a chroma downsampled 4:2:0YCbCr version of the initial image;
   determining a measure of quality by comparing the initial image and the test image;
   modifying the determined initial coefficients to increase the determined measure of quality; and
   determining luma values from 4:4:4 RGB video data for encoding chroma downsampled 4:2:0 YCbCr video data into a bitstream using the modified coefficients.

6. An apparatus for determining luma values from 4:4:4 RGB video data for encoding chroma downsampled 4:2:0 YCbCr video data into a bitstream, the appraratus comprising:
   means for determining initial coefficents for a region of a colour space, the region being one of a plurality of regions located in the colour space and each region having a plurality of associated coefficients
   means for applying the determined initial coefficients to an initial image to produce a test image, the test image being a chroma downsampled 4:2:0 YCbCr version of the initial image;
   means for determining a measure of quality by comparing the initial image and the test image;
   means for modifying the determined initial coefficients to increase the determined measure of quality; and
   means for determining luma values from 4:4:4 RGB video data for encoding chroma downsampled 4:2:0 YCbCr video data into a bitstream using the modified coefficients.

7. A non-transitory computer readable medium having a computer program stored thereon for determining luma values from 4:4:4 RGB video data for encoding chroma downsampled 4:2:0 YCbCr video data into a bitstream, the program comprising:
   code for determining initial coefficents for a region of a colour space, the region being one of a plurality of regions located in the colour space and each region having a plurality of associated coefficients
   code for applying the determined initial coefficients to an initial image to produce a test image, the test image being a chroma downsampled 4:2:0 YCbCr version of the initial image;
   code for determining a measure of quality by comparing the initial image and the test image;
   code for modifying the determined initial coefficients to increase the determined measure of quality; and
   code for determining luma values from 4:4:4 RGB video data for encoding chroma downsampled 4:2:0 YCbCr video data into a bitstream using the modified coefficients.

* * * * *